United States Patent
Tomita et al.

(10) Patent No.: US 7,118,507 B2
(45) Date of Patent: Oct. 10, 2006

(54) AUTOMATIC REDUCTION-RATIO CHANGING APPARATUS

(75) Inventors: Seiji Tomita, Yokosuka (JP); Motohiro Sotome, Ayase (JP)

(73) Assignee: SMC Kabushiki Kaisha, Tokyo (JP)

( * ) Notice: Subject to any disclaimer, the term of this patent is extended or adjusted under 35 U.S.C. 154(b) by 182 days.

(21) Appl. No.: 10/747,358

(22) Filed: Dec. 30, 2003

(65) Prior Publication Data

US 2004/0152556 A1 Aug. 5, 2004

(30) Foreign Application Priority Data

Feb. 4, 2003 (JP) .............................. 2003-027652

(51) Int. Cl.
*F16H 3/74* (2006.01)

(52) U.S. Cl. .................... 475/263; 475/294; 192/56.5; 192/56.51; 173/122; 173/127; 173/178; 173/216; 173/217

(58) Field of Classification Search ................ 475/263, 475/294, 320; 192/36.5, 36.51; 173/122, 173/127, 216, 217, 178
See application file for complete search history.

(56) References Cited

U.S. PATENT DOCUMENTS

| 3,872,742 | A | * | 3/1975 | States .......................... 475/299 |
| 4,869,139 | A | * | 9/1989 | Gotman ........................ 81/475 |
| 4,892,013 | A | * | 1/1990 | Satoh .......................... 475/266 |
| 4,898,249 | A | * | 2/1990 | Ohmori ....................... 173/176 |
| 6,076,438 | A | * | 6/2000 | Rahm ........................... 81/473 |
| 6,431,289 | B1 | * | 8/2002 | Potter et al. .................. 173/47 |
| 6,887,176 | B1 | * | 5/2005 | Sasaki ......................... 475/150 |

FOREIGN PATENT DOCUMENTS

JP 09-295278 11/1997

* cited by examiner

*Primary Examiner*—Charles A. Marmor
*Assistant Examiner*—David D. Le
(74) *Attorney, Agent, or Firm*—Paul A. Guss

(57) ABSTRACT

An automatic reduction-ratio changing apparatus comprises a planetary gear mechanism including a sun gear, planet gears, and an internal gear. When a load, which exceeds a predetermined torque, is applied to the internal gear, a pawl of a lock lever is engaged with a ratchet section of a housing to stop the rotation of the internal gear and lock the internal gear. When a displaceable member of an actuator is displaced from an outward route to a homeward route, the rotation of a motor is reversed, and an input shaft and a cam are rotated in a reverse direction to release from the locked state. Accordingly, the speed reduction ratio, which is transmitted from an output shaft to the actuator, is automatically switched.

20 Claims, 32 Drawing Sheets

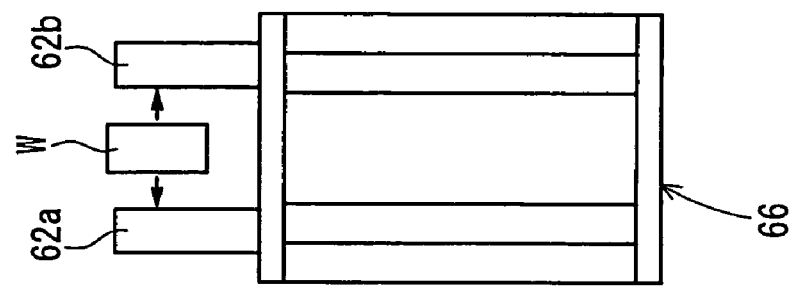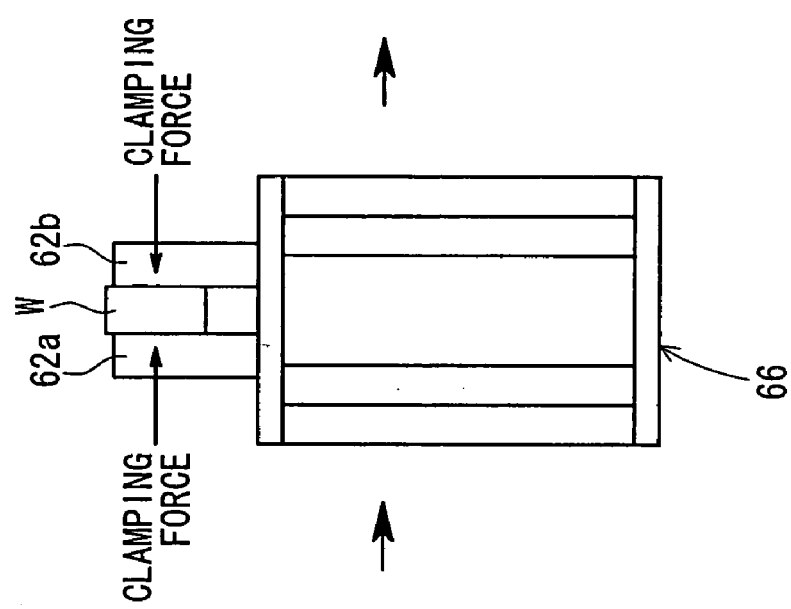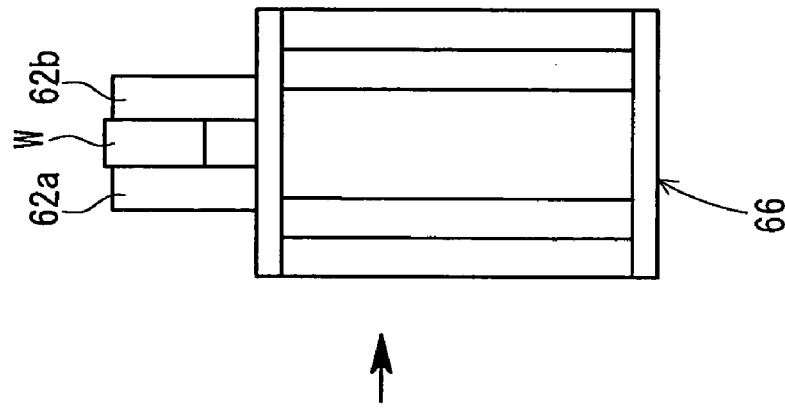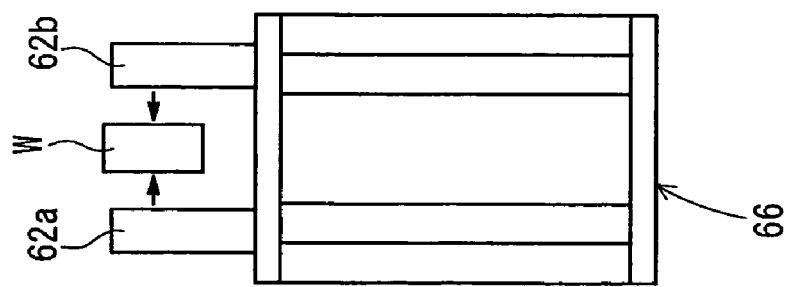

AUTOMATIC REDUCTION-RATIO CHANGING APPARATUS

BACKGROUND OF THE INVENTION

1. Field of the Invention

The present invention relates to an automatic reduction-ratio changing apparatus which makes it possible to automatically change the speed reduction ratio transmitted from an output shaft to a displaceable member of an actuator by using a planetary gear mechanism, an internal gear lock mechanism, and an internal gear lock release mechanism.

2. Description of the Related Art

A nut runner, which is an automatic tightening tool for screws of, for example, nuts and bolts, is known as an apparatus to which a speed reduction ratio changing mechanism is applied.

The nut runner of this type comprises a sun gear and planet gears. The sun gear and the planet gears, which function as a first speed reduction section and which constitute a planetary gear mechanism, are provided at an end of a drive shaft of an air motor. A first output shaft, which is integrally connected to the planet gears of the first speed reduction section, has a decreased number of revolutions so that the output torque thereof is large. The nut runner further comprises second and third speed reduction sections each of which comprises a planetary gear mechanism as well. The second and third speed reduction sections are connected to the first speed reduction section so that the speed is further reduced. Accordingly, a high torque is generated on a nut-tightening socket which is installed to an output shaft of the third speed reduction section. Thus, the nut is tightened by means of the output torque.

For example, Japanese Laid-Open Patent Publication No. 9-295278, which relates to a nut runner as described above, discloses the following system. That is, an internal gear, which is included in a planetary gear mechanism as a speed reduction section, is rotatable. Further, a clutch section is arranged for the internal gear, in which an output shaft and the internal gear are rotated in an integrated manner when no load is applied to the output shaft. When some load is applied to the output shaft, the rotation of the internal gear is stopped, and the output shaft is rotated at a reduced speed by the clutch section.

However, if the technical concept disclosed in Japanese Laid-Open Patent Publication No. 9-295278 is applied, for example, to an actuator which reciprocates such as a piston rod of a fluid pressure cylinder and a slider of a linear actuator, the speed reduction ratio cannot be switched or changed even when an air motor is reversed, because it is impossible to disengage the bitten roller. In this situation, the piston rod or the slider, which has been displaced along the outward or outgoing route, cannot be displaced thereafter at a high speed along the homeward or return route.

In other words, the following reason may be pointed out. In the case of the technical concept disclosed in Japanese Laid-Open Patent Publication No. 9-295278, after the rotation of the internal gear is stopped and the high torque is generated at the terminal end of the outward route, the displacement is performed at a low speed along the homeward route while retaining the state in which the rotation of the internal gear is stopped, without switching the speed reduction ratio.

SUMMARY OF THE INVENTION

A general object of the present invention is to provide an automatic reduction-ratio changing apparatus which makes it possible to automatically switch the speed reduction ratio so that an actuator may be displaced along the homeward route at a high speed after the actuator displaced along the outward route generates a high torque at the terminal end of the displacement.

According to the present invention, when a displaceable member of an actuator is displaced along the outward route, a sun gear and an internal gear are rotated in an identical direction of rotation. When a load exceeding a preset predetermined torque is applied from the actuator to the internal gear via an output shaft, the internal gear, which are rotated in the same direction as that of the sun gear, is then rotated in a direction different from that of the sun gear. Accordingly, the rotation of the internal gear is stopped by a lock mechanism, and the internal gear is locked. When the internal gear is in the locked state, the speed reduction ratio, which is transmitted via the output shaft, is automatically switched or changed. The displaceable member of the actuator is displaced at a high torque and a low speed, for example, at the terminal end position of the outward route.

On the other hand, when the displaceable member of the actuator is displaced along with the homeward route from the terminal end position of the outward route, the polarity of the current to be supplied to a rotary driving source is reversed, the sun gear is rotated in a reverse direction, and the internal gear is released from the locked state. Therefore, the speed reduction ratio, which is transmitted from the output shaft to the displaceable member of the actuator, is automatically switched or changed, and the displaceable member of the actuator is displaced along the homeward route at a low torque and a high speed.

According to the present invention, it is possible to automatically change the speed reduction ratio corresponding to the outward route and the homeward route of the displaceable member of the actuator which reciprocates as described above.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 8A to 8D show front views illustrating states in which a workpiece is gripped by using a pair of arms of a chuck apparatus, and then the arms are separated from the workpiece;

DESCRIPTION OF THE PREFERRED EMBODIMENTS

Figure 1:
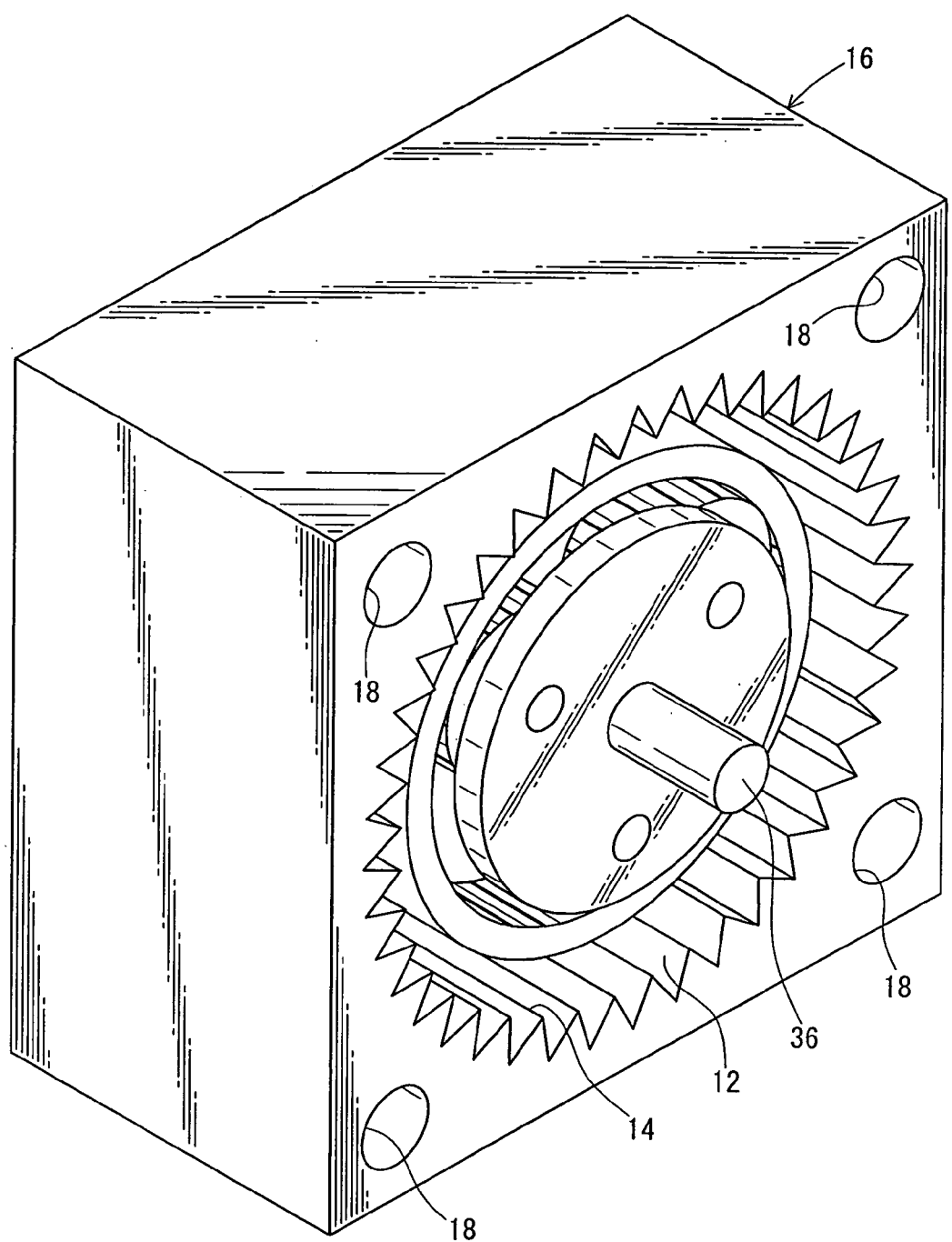
FIG. 1 is a perspective view illustrating an automatic reduction-ratio changing apparatus according to a first embodiment of the present invention.

With reference to FIG. 1, reference numeral 10 indicates an automatic reduction-ratio changing apparatus according to a first embodiment of the present invention.

The automatic reduction-ratio changing apparatus 10 comprises a boxy housing 16. The housing 16 has a ratchet section 14 provided with circumferential concave/convex teeth formed continuously on the inner wall surface of a straightly penetrating hole 12 having a circular cross section. Attachment holes 18, which are usable to attach the housing 16 to another member, for example, by connecting elements such as bolts as described later on, are formed at portions in the vicinity of four corners of the housing 16.

Figure 2:
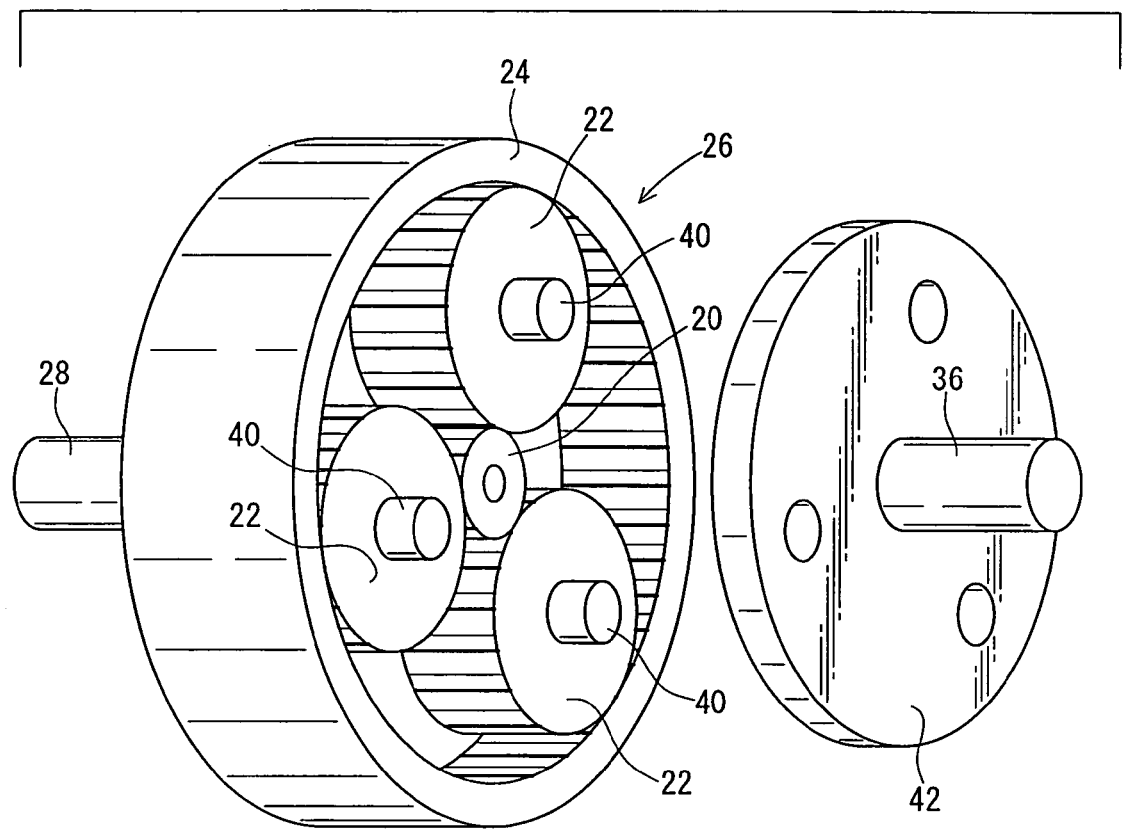
FIG. 2 is an exploded perspective view illustrating a planetary gear mechanism of the automatic reduction-ratio changing apparatus shown in FIG. 1.

As shown in FIG. 2, a planetary gear mechanism 26 is accommodated in the hole 12 formed at the central portion of the housing 16. The planetary gear mechanism 26 comprises a single sun gear 20 having a small diameter, a plurality of (or three) planet gears 22 each having a middle diameter of the same outer diameter, and a single internal gear 24 having a large diameter.

In this arrangement, the three planet gears 22 have angles of separation of about 120 degrees in the circumferential direction, and are provided on the outer circumference of the sun gear 20 which is positioned at the center. Thus, the planet gears 22 revolve around the center (and rotate on the axes) while are meshed with the sun gear 20. The internal gear 24 having the large diameter is provided on the outer circumferences of the planet gears 22.

Figure 3:
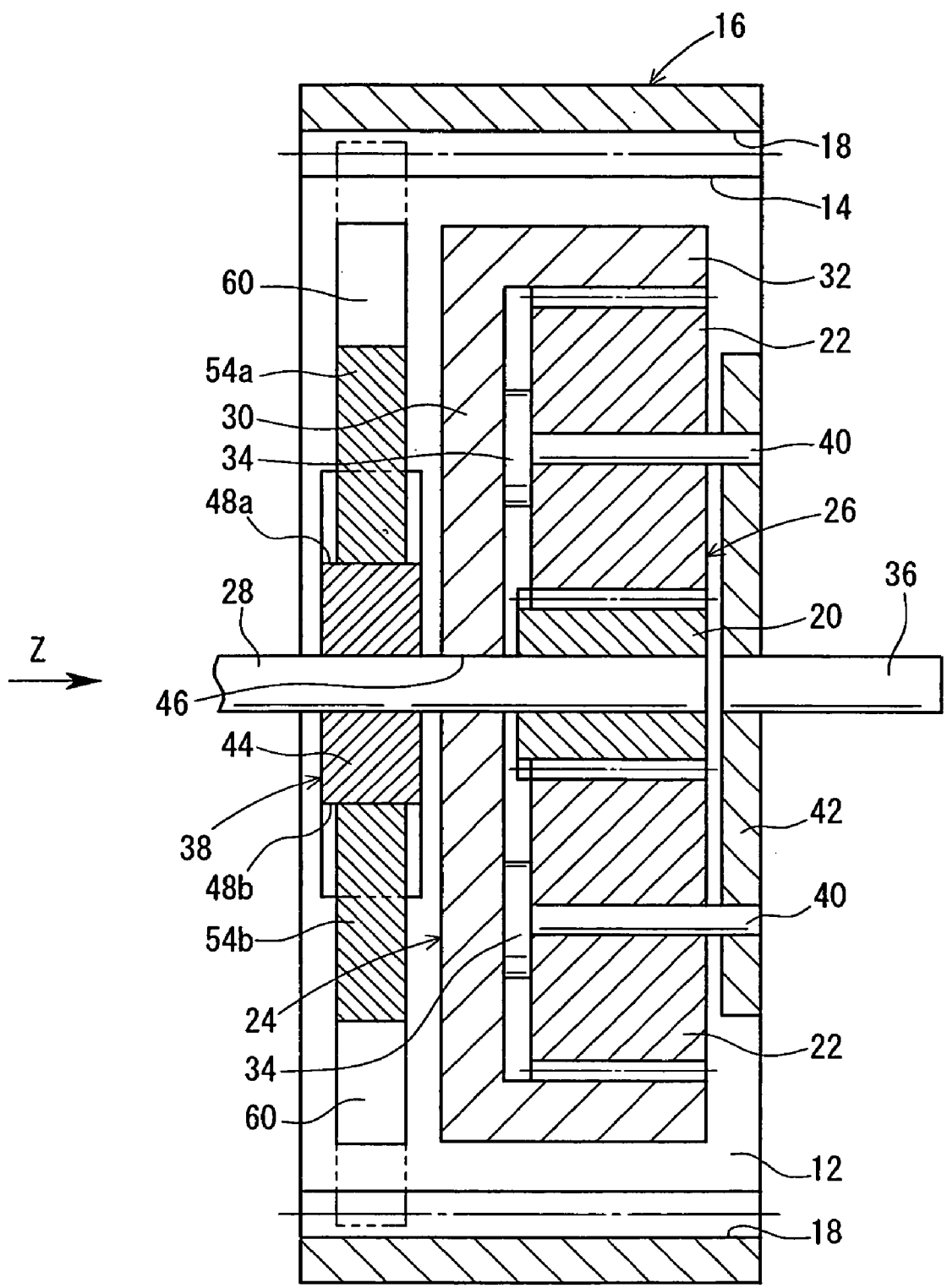
FIG. 3 is a vertical sectional view illustrating the automatic reduction-ratio changing apparatus shown in FIG. 1.

As shown in FIG. 3, the internal gear 24 has a disk-shaped wall section 30 which is loosely fitted to an input shaft 28 with a predetermined clearance as described later on, and an annular flange section 32 which protrudes from the wall section 30 in a substantially horizontal direction perpendicular thereto and which has the teeth formed on the inner circumferential surface meshed with the planet gears 22.

In this arrangement, the internal gear 24 is not fixed to the housing 16. The internal gear 24 is provided in a free state in which the rotary motion is not transmitted by the input shaft 28. Bearing sections 34 are provided for the planet gears 22 for abutting against the inner wall surface of the wall section 30 of the internal gear 24.

A lock mechanism 38 is arranged on one side of the housing 16 on which the input shaft 28 is provided for stopping the rotation of the internal gear 24 when the load is applied to an output shaft 36.

The planetary gear mechanism 26 has the input shaft 28 which is provided on one side of the housing 16 and which is coaxially connected to a rotary driving shaft of an unillustrated rotary driving source via a coupling member (not shown). The output shaft 36 is provided on the opposite side of the input shaft 28. The output shaft 36 has a disk section 42 fastened by a plurality of pins 40 axially attached to the respective planet gears 22 and is integrally connected to the disk section 42 to transmit the rotary motion of the rotary driving source to an unillustrated actuator. The input shaft 28 disposed on one side and the output shaft 36 disposed on the other side are provided coaxially but are separate members. A bearing member (not shown) such as a plate may be provided for the housing 16, for rotatably supporting the input shaft 28 and the output shaft 36.

A cam 44 (described later on) and the sun gear 20 are fixed integrally and coaxially to the input shaft 28, and are separated from each other by a predetermined distance with the wall section 30 of the internal gear 24 interposed therebetween. The cam 44 and the sun gear 20 are rotated integrally via the input shaft 28 by the rotation of the unillustrated rotary driving source.

As shown in FIG. 3, the input shaft 28 penetrates through a hole 46 formed through the wall section 30 of the internal gear 24. An unillustrated clearance is provided between the hole 46 formed through the wall section 30 of the internal gear 24 and the outer circumferential surface of the input shaft 28. Therefore, the internal gear 24 is free from the rotary motion of the input shaft 28.

Figure 4:
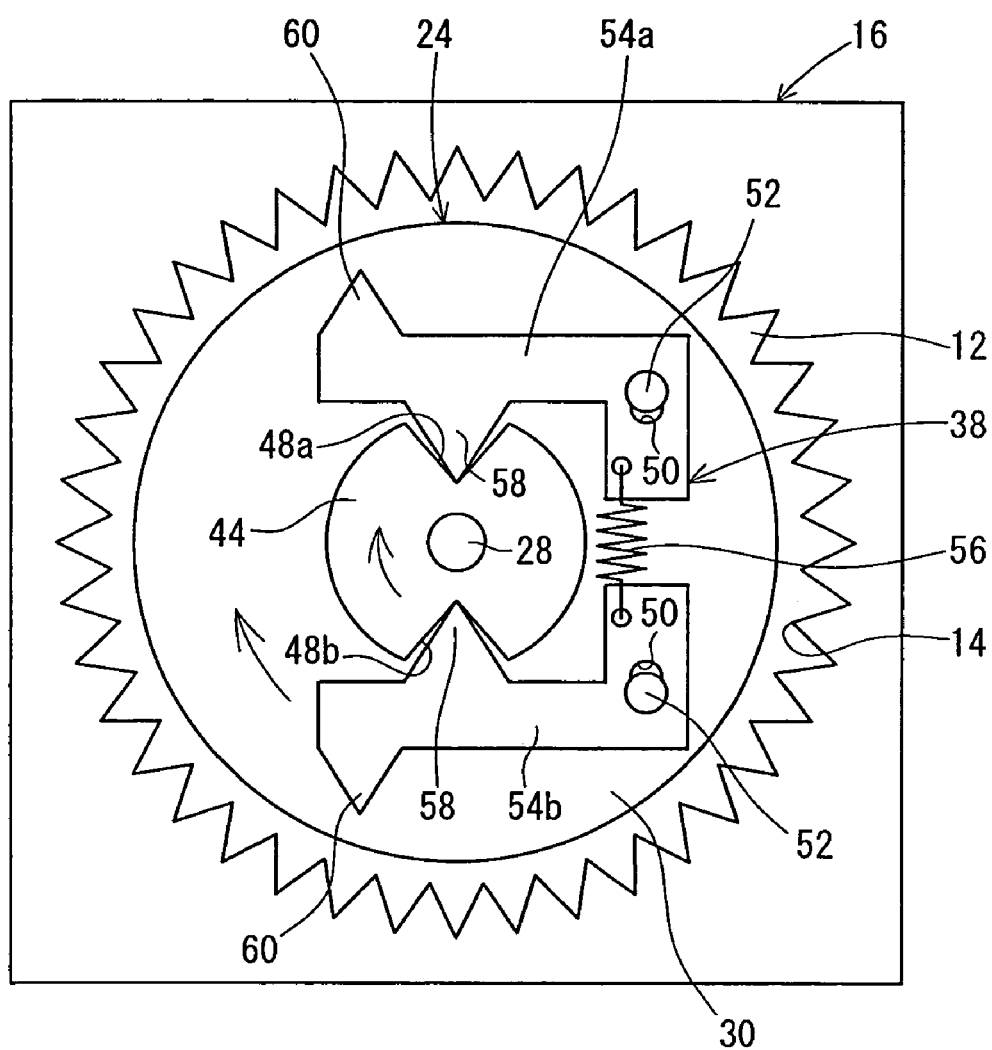
FIG. 4 is a side view illustrating an initial position for an internal gear and a sun gear to rotate clockwise.

As shown in FIG. 4, the lock mechanism 38 includes the disk-shaped cam 44 which has a pair of V-grooves 48a, 48b and which is rotatable together with the input shaft 28. The pair of V-grooves 48a, 48b are formed on the outer circumferential surface, separated from each other by 180 degrees, and recessed radially inwardly. The lock mechanism 38 further includes a pair of lock levers 54a, 54b which are installed to the wall section 30 of the internal gear 24 by the pins 52 engaged with long holes 50, and a spring member 56 which is fastened to first ends of the pair of lock levers 54a, 54b disposed closely to the long holes 50, respectively, and which pulls the ends of the lock levers 54a, 54b separated from each other by a predetermined distance in directions so that the ends of the lock levers 54a, 54b approach one another.

The pair of lock levers 54a, 54b have symmetrical shapes having substantially L-shaped cross sections, respectively. Each of the lock levers 54a, 54b has a cam-engaging projection 58 for engagement with the V-groove 48a, 48b of the cam 44, and a pawl 60 for engagement with the ratchet section 14 of the housing 16. The cam-engaging projection 58 and the pawl 60 protrude in the opposite directions. The pair of lock levers 54a, 54b are provided swingably by predetermined angles about the support points of the pins 52 which are engaged with the long holes 50 formed to have substantially elliptic cross sections.

The pair of lock levers 54a, 54b are rotatable together with the internal gear 24, because the lock levers 54a, 54b are installed (fixed) to the internal gear 24.

The automatic reduction-ratio changing apparatus 10 according to the first embodiment of the present invention is basically constructed as described above. Next, its operation, function, and effect will be explained.

At first, as shown in FIG. 4, the lock mechanism 38 is in the initial position in which the cam-engaging projections 58 of the lock levers 54a, 54b are engaged with the V-grooves 48a, 48b of the cam 44, and the cam 44 is fastened by the lock levers 54a, 54b.

At the initial position as described above, the unillustrated rotary driving source is energized to transmit the rotary driving force of the rotary driving source to the cam 44 and the sun gear 20 by the input shaft 28. It is assumed that the input shaft 28, the cam 44, and the sun gear 20 are rotated clockwise by the rotary driving force as viewed in the direction from the input shaft 28 to the output shaft 36 (direction of the arrow Z shown in FIG. 3).

In this situation, when the sun gear 20 is rotated, the three planet gears 22 meshed with the sun gear 20 revolve around the center of the sun gear 20. Further, the internal gear 24 is rotated in the same direction (clockwise) as that of the cam 44 by the lock levers 54a, 54b in accordance with the rotation of the cam 44 (see FIG. 4).

In other words, the lock levers 54a, 54b for stopping the cam 44 are installed to the internal gear 24. Therefore, the cam 44 and the internal gear 24 are rotated in the same direction (clockwise), and the planet gears 22 revolve around the center of the sun gear 20 clockwise since the sun gear 20 and the planet gears 22 are meshed. In this situation, the internal gear 24 is not fixed, for example, to the housing 16. Therefore, the planet gears 22 do not rotate on the axes, but only revolve around the center of the sun gear 20.

Therefore, the planet gears 22 and the internal gear 24 are rotated in the identical direction, and the output shaft 36 is rotated by the disk section 42 and the pins 40 axially attached to the planet gears 22. As a result, the speed of rotation (rotary motion), which is equivalent to the rotation of the input shaft 28, is transmitted to the output shaft 36, and the output shaft 36 is rotated at a high speed. Accordingly, the high speed rotary motion is transmitted from the output shaft 36 to the actuator.

When the displaceable member of the actuator reciprocates linearly, for example, when a chuck apparatus 66 is used in which a pair of arms (displaceable members) 62a, 62b separated from each other by a predetermined distance are displaced in directions to approach one another to grip a workpiece W, the high speed rotary motion transmitted from the output shaft 36 can be used to displace the pair of arms 62a, 62b at high speed. The pair of arms 62a, 62b approach the workpiece W starting from the initial position at which the pair of arms 62a, 62b are separated from each other by the predetermined distance as shown in FIG. 8A.

As shown in FIG. 8B, when the pair of arms 62a, 62b are displaced by predetermined distances toward the workpiece W to abut against the workpiece W, and the number of revolutions of the output shaft 36 becomes smaller than the number of revolutions of the input shaft 28, the internal gear 24 is rotated counterclockwise which is the direction opposite to the above. In other words, the internal gear 24 is rotated counterclockwise, because the input shaft 28 is rotated even when the rotation of the output shaft 36 is stopped.

When the internal gear 24 is rotated counterclockwise with respect to the cam 44 which is rotated clockwise, the lock levers 54a, 54b, which are installed to the internal gear 24, are displaced radially outwardly to separate from the cam 44 against the pulling force of the spring member 56, and the cam-engaging projections 58 of the lock levers 54a, 54b are disengaged from the V-grooves 48a, 48b of the cam 44. When the cam-engaging projections 58 run away from the V-grooves 48a, 48b to engage with the outer circumferential surface of the cam 44, the pair of lock levers 54a, 54b swing respectively by predetermined angles in directions (radially outward direction) in which they are separated from each other about the support points of the pins 52 which engage with the long holes 50.

Figure 5:
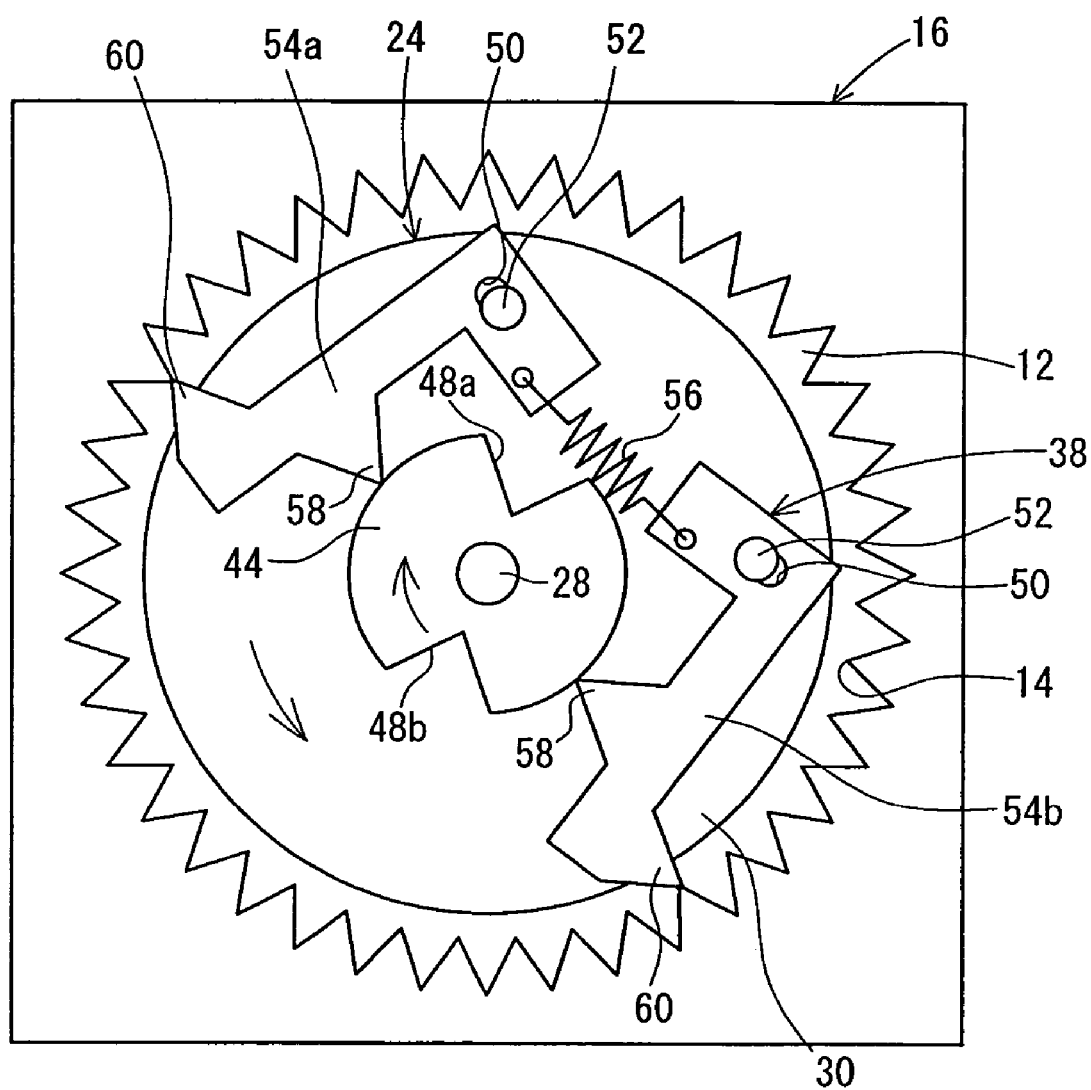
FIG. 5 is a side view in which the internal gear is rotated counterclockwise starting from the state shown in FIG. 4.

When the pair of lock levers 54a, 54b are displaced radially outwardly, and the ends of the pawls 60 abut against the ends of the ratchet section 14 of the housing 16, then the pair of lock levers 54a, 54b are displaced in the directions in which the lock levers 54a, 54b are separated from each other along the long holes 50 against the spring force (pulling force) of the spring member 56 as shown in FIG. 5.

That is, as shown in FIG. 5, the pair of lock levers 54a, 54b are limited against the displacement in the radially outward direction by the ends of the pawls 60 abutting against the ends of the ratchet section 14 of the housing 16. The pair of lock levers 54a, 54b are displaced in the directions to separate from each other along the long holes 50 provided at the ends opposite to the pawls 60.

In other words, when the ends of the pawls 60 of the pair of lock levers 54a, 54b abut against the ends of the ratchet section 14 of the housing 16, a large load is applied to the lock levers 54a, 54b. However, the lock levers 54a, 54b are displaced along the long holes 50 which function as release mechanism. Accordingly, the load, which is applied to the lock levers 54a, 54b, can be appropriately absorbed.

When the pawls 60, which are formed at the ends of the pair of lock levers 54a, 54b, are meshed with the ratchet section 14 formed on the hole 12 of the housing 16, the internal gear 24 is in the locked state, and the counterclockwise rotation of the internal gear 24 is stopped. Actually, the force, which is required to stop the counterclockwise rotation of the internal gear 24, is not obtained even when only the pawl 60 of one lock lever 54a is meshed with the ratchet section 14 and the pawl 60 of the other lock lever 54b is engaged with the ratchet section 14, because the internal gear 24 is rotated counterclockwise.

Figure 6:
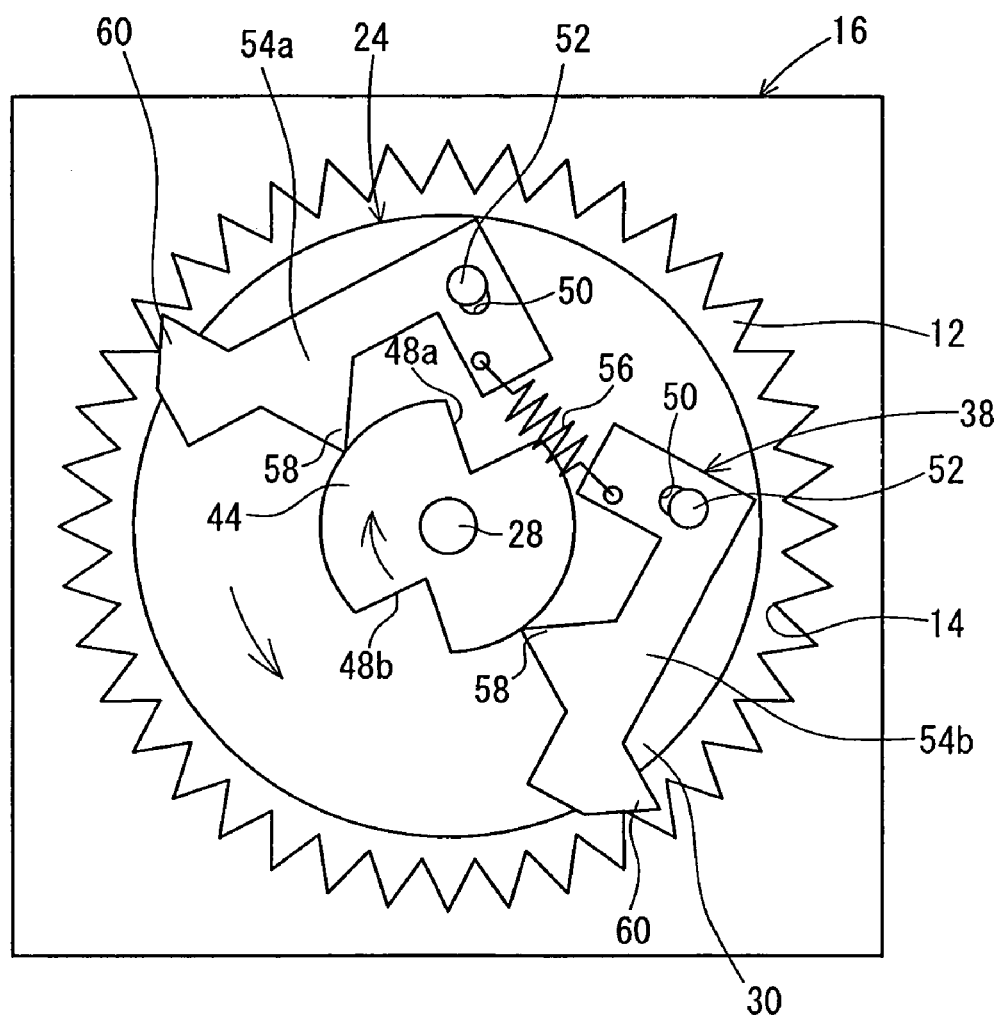
FIG. 6 is a side view illustrating a locked state in which lock levers are rotated starting from the state shown in FIG. 5, and pawls are engaged with a ratchet section.

As shown in FIG. 6, when the pawls 60 of the lock levers 54a, 54b are meshed with the ratchet section 14 of the housing 16, the ends of the lock levers 54a, 54b are pulled by the spring force of the spring member 56, and the ends of the pair of lock levers 54a, 54b are displaced in the directions to approach one another along the long holes 50.

As a result, the internal gear 24 is fixed to the housing 16 by the lock levers 54a, 54b (locked state). Accordingly, the planet gears 22 start to revolve around the center of the sun gear 20 while rotating on the axes in accordance with the rotation of the sun gear 20. A decelerated speed of rotation and an increased torque are transmitted to the output shaft 36 connected to the planet gears 22 by the pins 40. When the increased torque is transmitted to the pair of arms 62a, 62b of the chuck apparatus 66 by the output shaft 36, the workpiece W is clamped by the pair of arms 62a, 62b with the strong force (see FIG. 8C).

The speed reduction ratio, which is obtained when the internal gear 24 is in the locked state, is represented by 1/(1+Z(C)/Z(A)) provided that Z(A) represents the number of teeth of the sun gear 20 and Z(C) represents the number of teeth of the internal gear. The output torque from the output shaft 36 is (1+Z(C)/Z(A)) times as high as the input torque from the input shaft 28. For example, when the number of teeth of the sun gear 20 is 12 (twelve) and the number of teeth of the internal gear 24 is 66 (sixty-six), the torque is obtained 6.5 times as high as the input torque.

On the other hand, when the polarity of the current to be applied to the unillustrated rotary driving source is reversed after the workpiece W is transported to a desired position while retaining the state in which the workpiece W is clamped by the pair of arms 62a, 62b, the rotary motion transmitted to the input shaft 28 is reversed, and the internal gear 24 is released from the locked state effected by the lock levers 54a, 54b.

Figure 7:
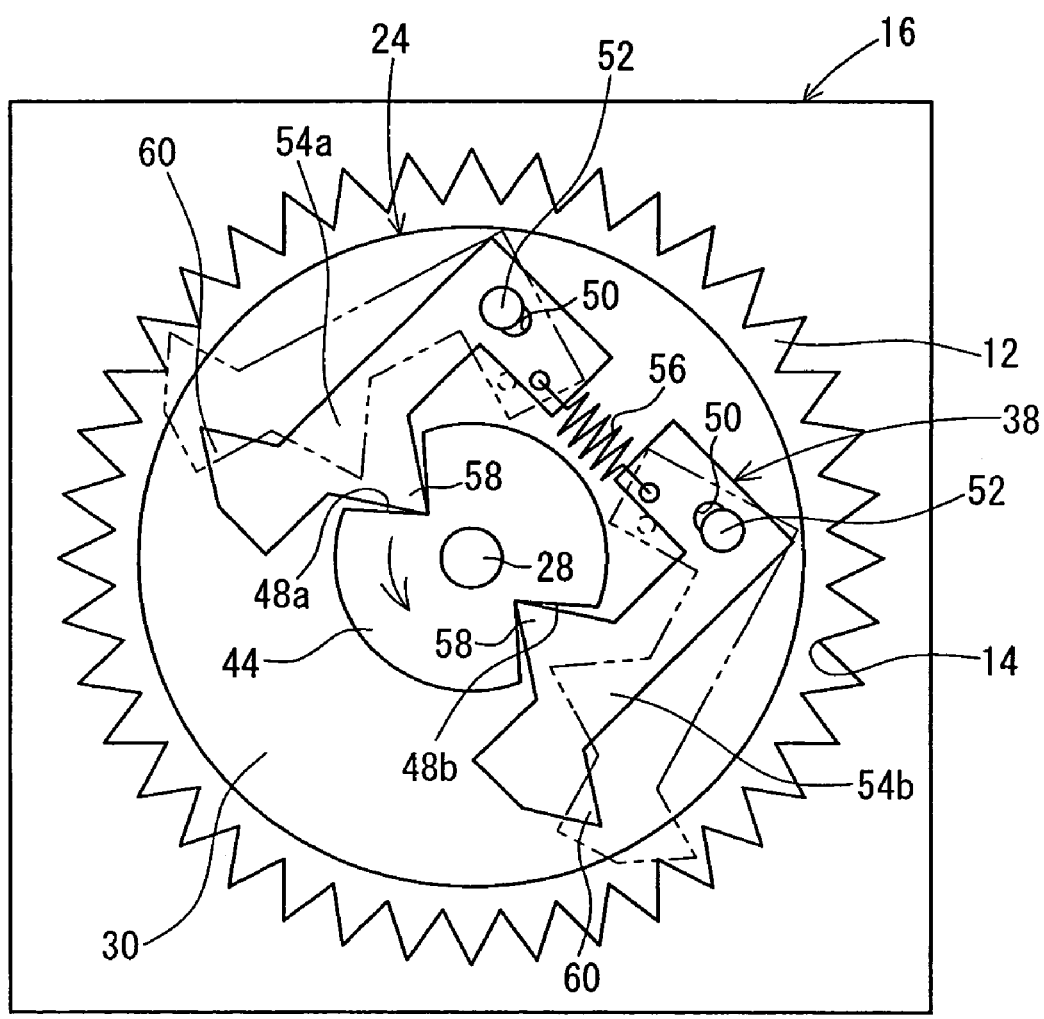
FIG. 7 is a side view illustrating a state in which the pawls of the lock levers are separated from the ratchet section to release from the locked state.

That is, the cam 44 and the sun gear 20 are rotated counterclockwise opposite to the above by the input shaft 28 as shown in FIG. 7 in the state in which the internal gear 24 is locked by the lock levers 54a, 54b. Accordingly, the pawls 60 of the lock levers 54a, 54b are displaced radially inwardly to separate from the ratchet section 14 of the housing 16 by being pulled by the spring member 56. The ratchet section 14 of the housing 16 is released from the engaged state effected by the pawls 60 of the lock levers 54a, 54b. Therefore, the cam 44 is rotated counterclockwise, and the cam-engaging projections 58 of the lock levers 54a, 54b are engaged with the V-grooves 48a, 48b of the cam 44. Accordingly, the cam 44 is fastened by the lock levers 54a, 54b, and the cam 44 and the internal gear 24 are rotated in the identical direction.

When the polarity of the rotary driving source is changed or switched to rotate the cam 44 counterclockwise as described above, the internal gear 24 is automatically released from the locked state effected by the lock levers 54a, 54b, and it is possible to rotate the cam 44 and the internal gear 24 at high speed in the identical direction.

As a result, as shown in FIG. 8D, the pair of arms 62a, 62b of the chuck apparatus 66 can be linearly displaced at high speed in the directions to separate from the workpiece W in order to restore to the initial position.

The actuator connected to the output shaft 36 is not limited to the chuck apparatus 66 described above. The actuator includes all mechanisms which linearly or rotatingly reciprocate, such as unillustrated fluid pressure cylinders in which a piston rod (displaceable member) reciprocates, linear actuators in which a slider (displaceable member) reciprocates, rotary actuators, and clamp apparatuses in which a clamp arm (displaceable member) reciprocates.

Figure 26:
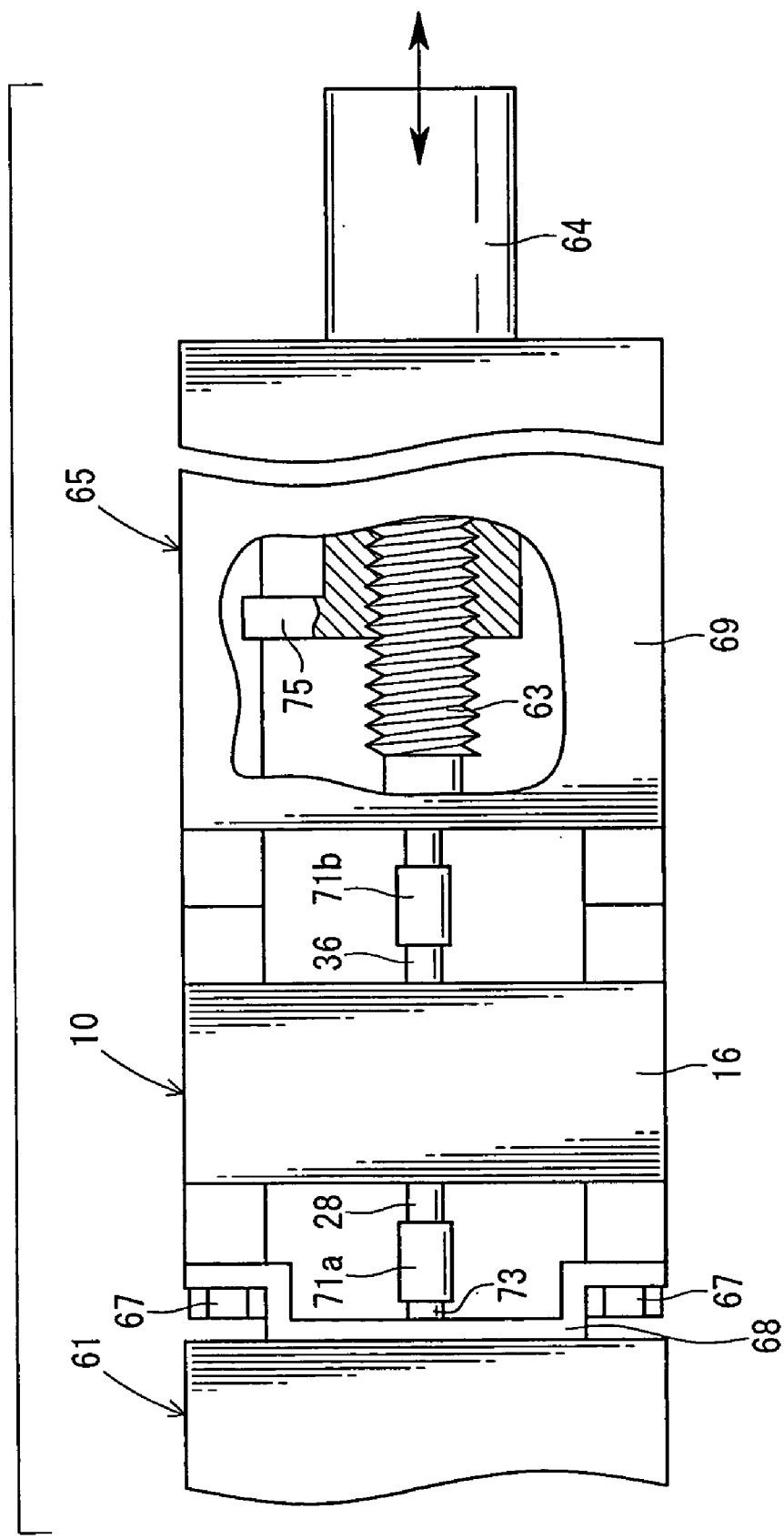
FIG. 26 is, with partial cutaway, a side view illustrating a state in which the single automatic reduction-ratio changing apparatus shown in FIG. 1 is interposed between a motor and an actuator.

As shown in FIG. 26, the automatic reduction-ratio changing apparatus 10 may be interposed between a motor 61 which functions as the rotary driving source and an actuator 65 which includes a rod (displaceable member) 64 reciprocating in directions of the arrows, for example, by converting the rotary motion transmitted to a rotary driving force transmission shaft 63 of a ball screw shaft into the rectilinear motion. The actuator 65, the automatic reduction-ratio changing apparatus 10, and the motor 61 may be integrated into one unit, for example, by connecting elements such as bolts 67.

That is, the bolts 67 are inserted through the attachment holes 18 formed at the four corners of the housing 16 and a bracket 68 screwed to the motor 61. Unillustrated screw sections of the bolts 67 are screwed into screw holes (not shown) formed in an actuator body 69. Accordingly, the actuator body 69, the housing 16, and the motor 61 are connected to one another integrally.

In this arrangement, a rotary shaft 73 of the motor 61 is coaxially connected to the input shaft 28 by a first coupling member 71a, and the rotary driving force transmission shaft 63 of the actuator 65 is coaxially connected to the output shaft 36 by a second coupling member 71b. Accordingly, the rotary driving force of the motor 61 is transmitted to the rotary driving force transmission shaft 63. It is preferable that the motor 61 and the actuator body 69 are formed so that they are flush with the side surfaces of the housing 16 of the automatic reduction-ratio changing apparatus 10. A projection 75, which functions to prevent the rod 64 from rotating by being fastened by the inner wall surface of the actuator body 69, is formed at the end of the rod 64.

Figure 27:
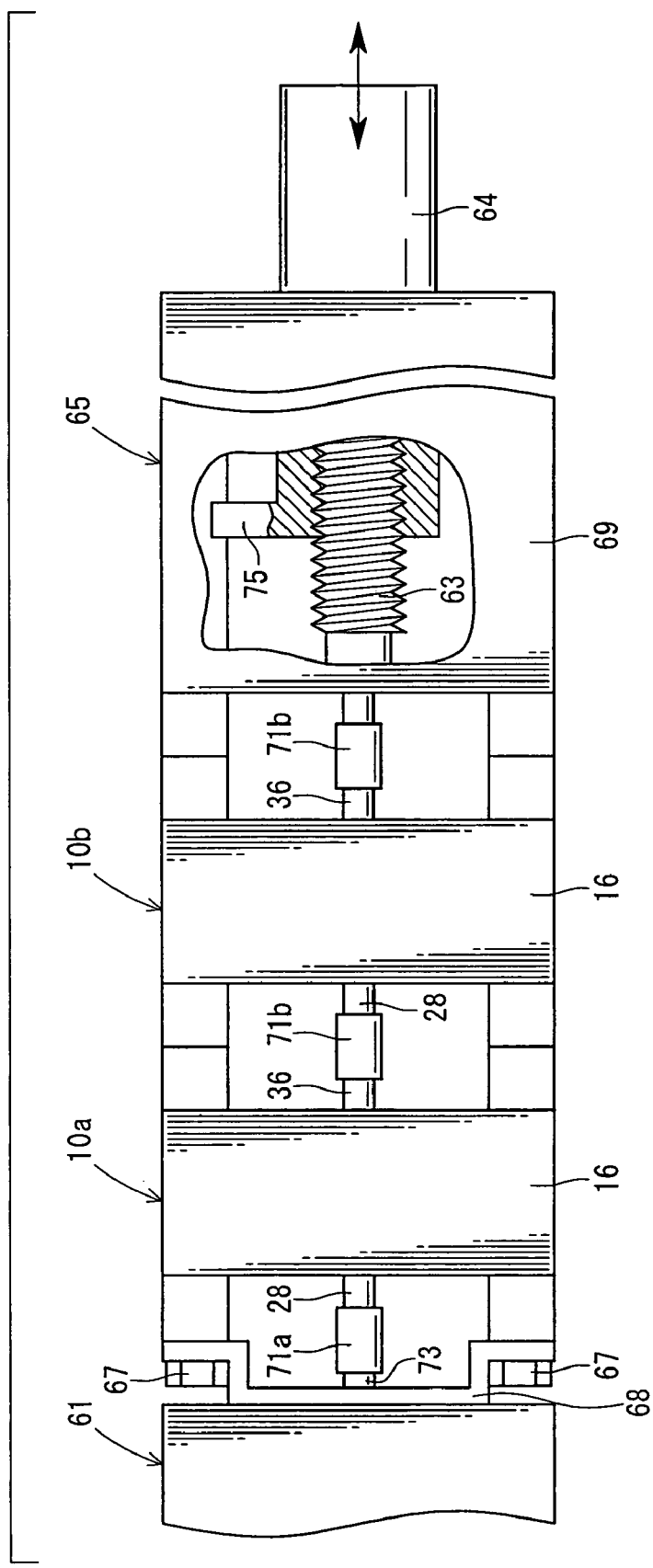
FIG. 27 is, with partial cutaway, a side view in which a plurality of the automatic reduction-ratio changing apparatuses shown in FIG. 1 are interposed between a motor and an actuator.
Figure 28:
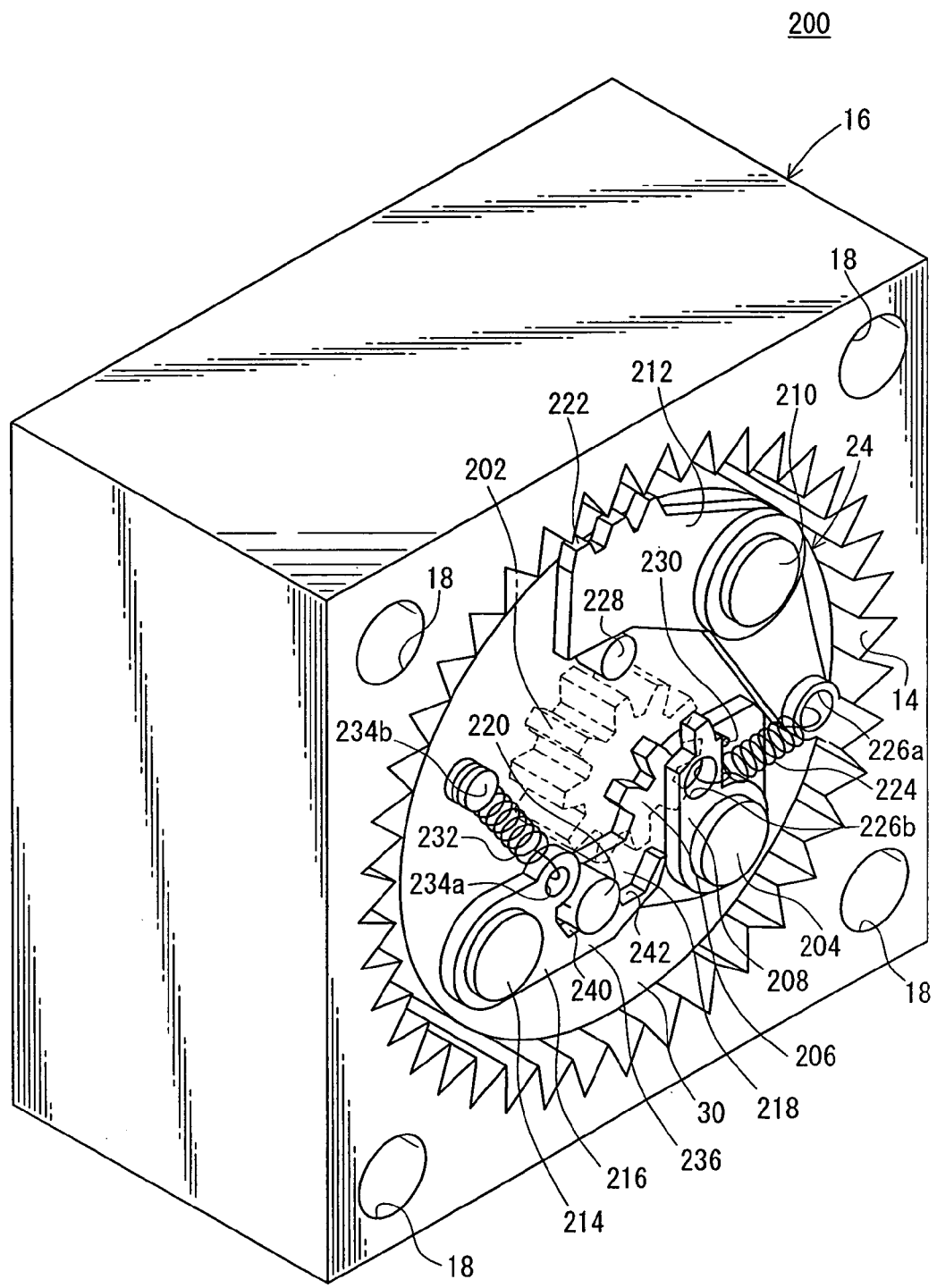
FIG. 28 is, with partial omission, a perspective view illustrating an automatic reduction-ratio changing apparatus according to a seventh embodiment of the present invention.

The number of the automatic reduction-ratio changing apparatus 10 interposed between the motor 61 and the actuator 65 is not limited to one. As shown in FIG. 27, when a plurality of the automatic reduction-ratio changing apparatuses 10a, 10b are disposed in series integrally by connecting elements, it is possible to further increase the speed reduction ratio.

Next, an automatic reduction-ratio changing apparatus 70 according to a second embodiment of the present invention is shown in FIGS. 9 to 12. In the embodiment described below, the constituent elements that are same as those of the automatic reduction-ratio changing apparatus 10 according to the first embodiment are designated by the same reference numerals, and the detailed explanation thereof will be omitted.

The automatic reduction-ratio changing apparatus 70 according to the second embodiment has the following feature. The automatic reduction-ratio changing apparatus 70 is provided with a lock release mechanism 72 which is capable of reliably releasing the engaged state (locked state) of the pawls 60 of the lock levers 54a, 54b with respect to the ratchet section 14 of the housing 16.

Figure 12:
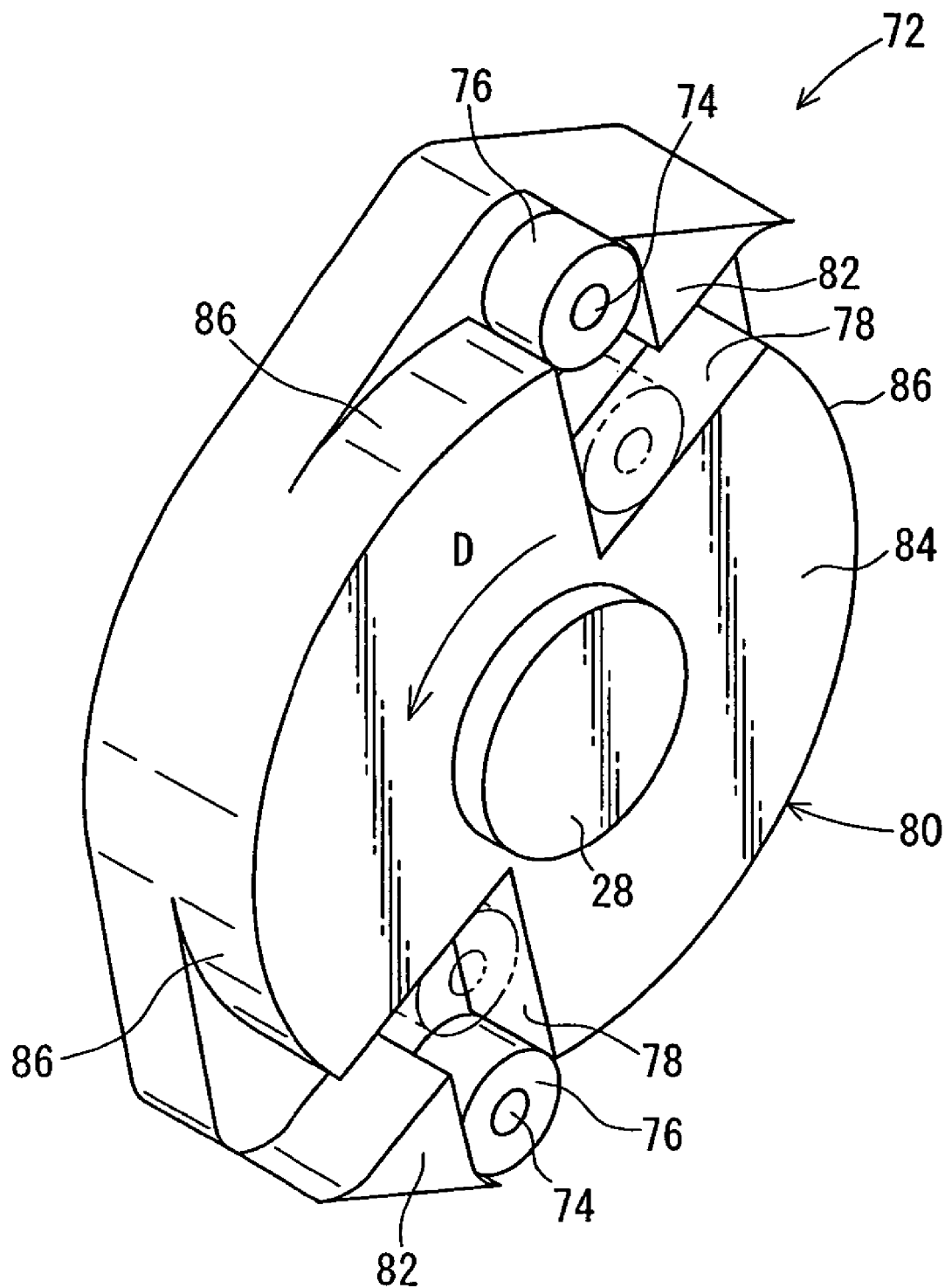
FIG. 12 is a magnified perspective view illustrating a lock release mechanism of the automatic reduction-ratio changing apparatus shown in FIG. 9.

As shown in FIG. 12, the lock release mechanism 72 has rollers 76 which are rotatably attached to acute ends of cam-engaging projections 58 by pins 74. Further, guide grooves 78 having substantially V-shaped cross sections, which guide the rollers 76, are formed on a cam 80. The groove width of the guide groove 78 is larger than the diameter of the roller 76.

The cam 80 has its substantially elliptic outer circumference. A pair of projections 82 (see FIG. 12) having substantially triangular cross sections are formed on outer circumferential portions disposed along the major axis so that they are opposed to one another while being spaced from each other by a predetermined distance. The projections 82 having the substantially triangular cross sections have the height flush with a flat surface section 84 of the main cam body.

A pair of guide groove entrances 86, which function to guide the roller 76 into the guide groove 78, are formed on the outer circumferential surface of the cam 80. Thus, the guide groove entrances 86 are continuous to the outer circumferential surface (see FIG. 12).

Figure 9:
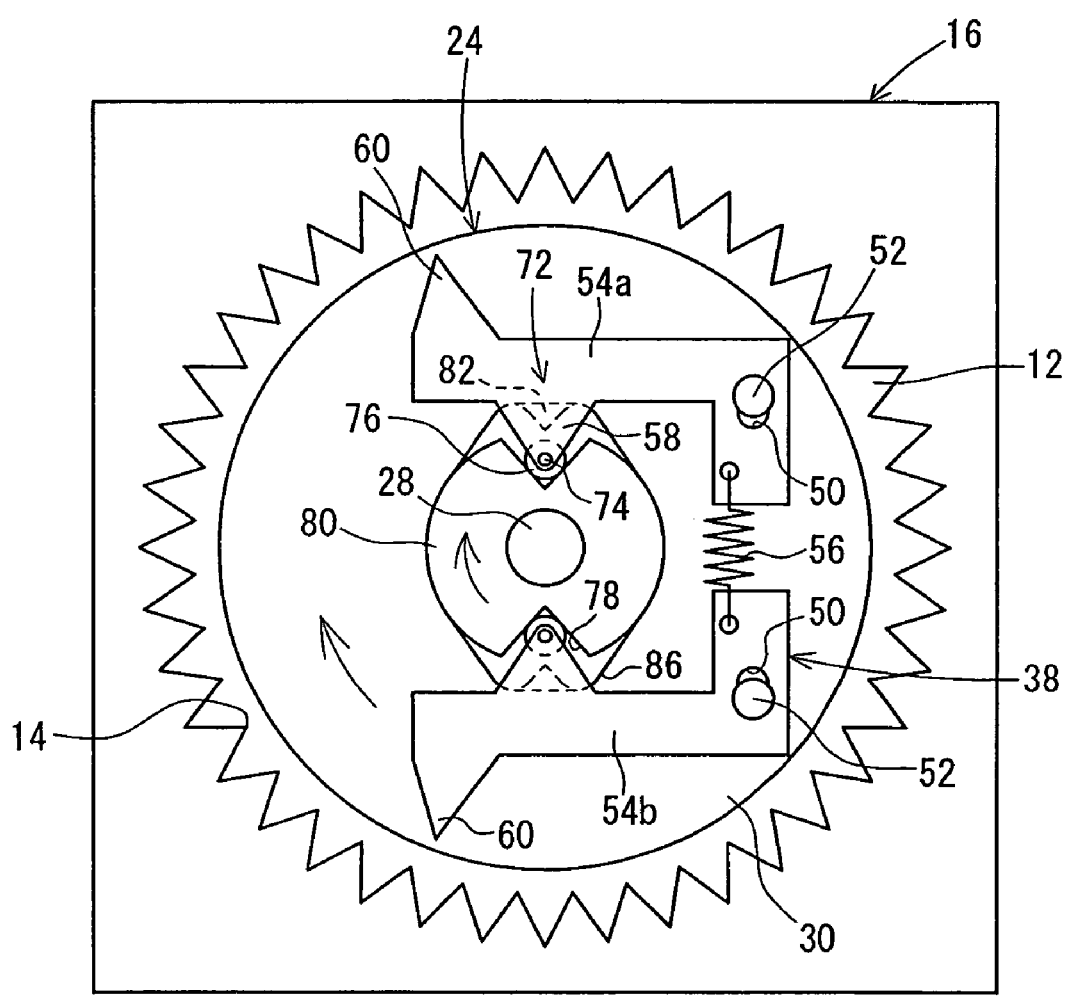
FIG. 9 is a side view illustrating an initial position of an automatic reduction-ratio changing apparatus according to a second embodiment of the present invention.

The operation of the lock release mechanism 72 will be schematically explained. As shown in FIG. 9, in the initial position, the rollers 76 are engaged into the guide grooves 78, wherein the input shaft 28, the cam 80, the lock levers 54a, 54b, and the internal gear 24 are rotated clockwise.

When the number of revolutions of the output shaft 36 is smaller than the number of revolutions of the input shaft 28 by the load torque applied from the actuator to the output shaft 36 at the initial position, the internal gear 24 is rotated counterclockwise which is the direction opposite to the above. The rollers 76 are disengaged from the guide grooves 78, and the pawls 60 of the lock levers 54a, 54b are engaged with the ratchet section 14 of the housing 16 (the locked state).

Figure 10:
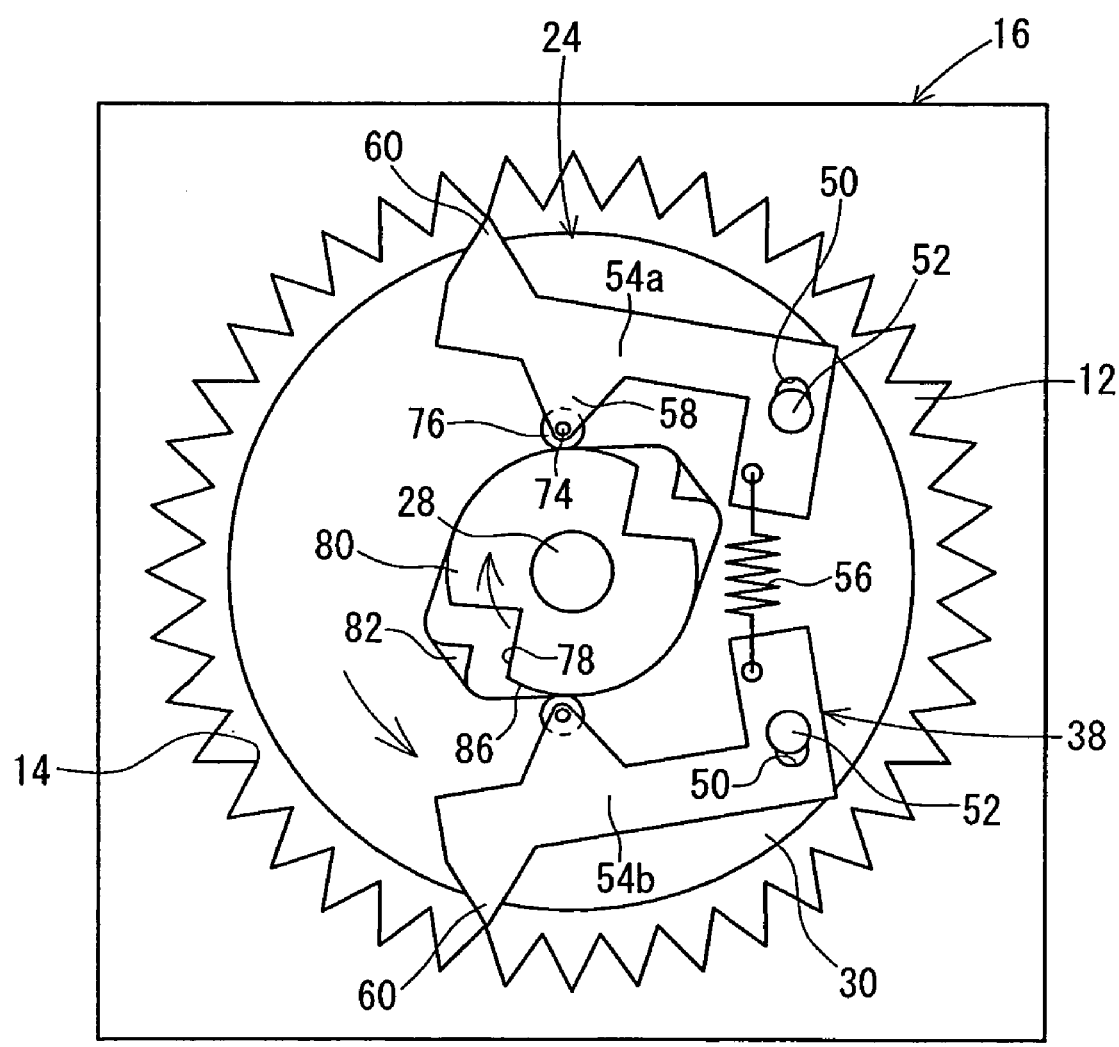
FIG. 10 is a side view in which the internal gear is rotated counterclockwise starting from the state shown in FIG. 9.
Figure 11:
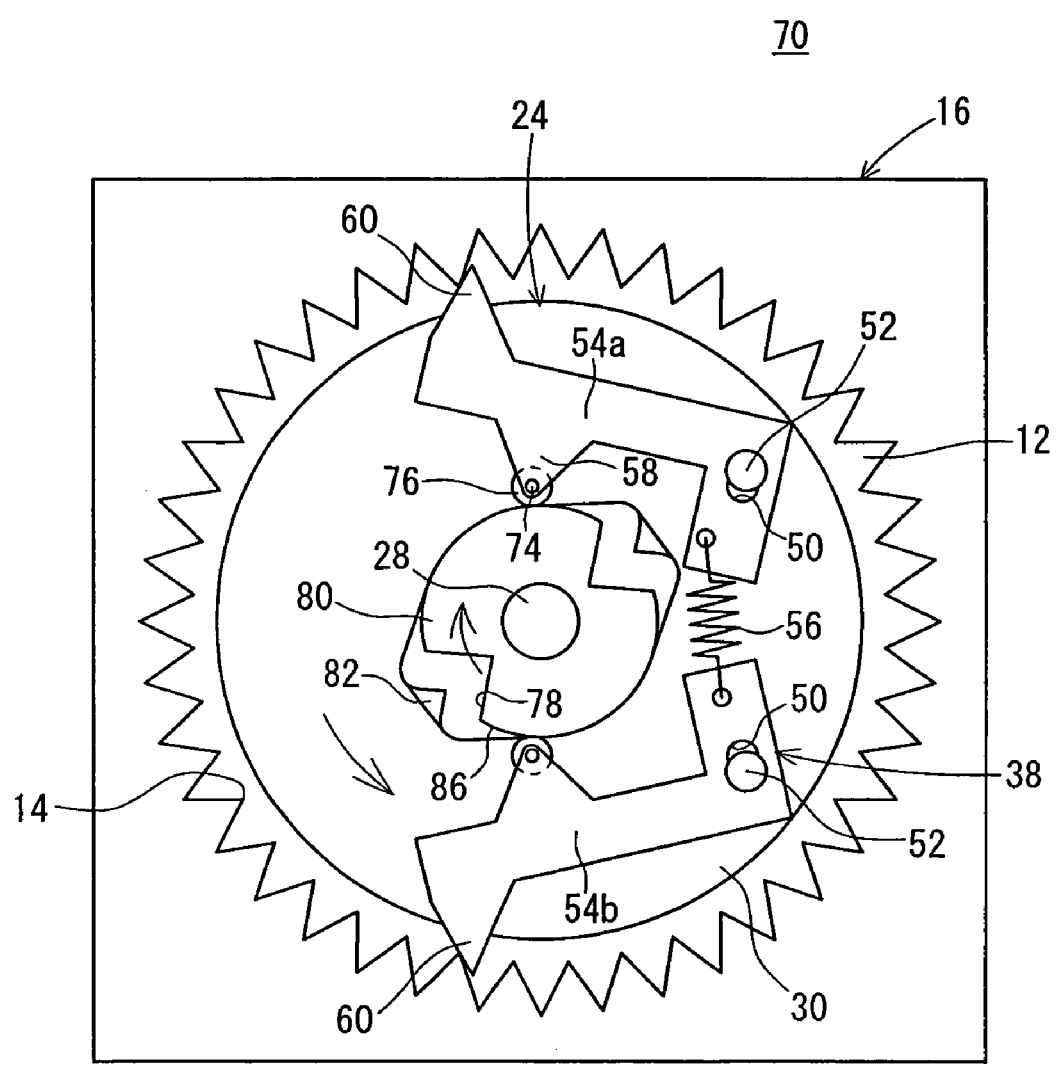
FIG. 11 is a side view illustrating a locked state in which lock levers are rotated starting from the state shown in FIG. 10, and pawls are engaged with a ratchet section.

In this embodiment, as shown in FIG. 10, when the ends of the pawls 60 of the lock levers 54a, 54b contact the ends of the ratchet section 14 of the housing 16, then the ends of the lock levers 54a, 54b are slightly displaced toward the ratchet section 14 (radially outwardly) along the long holes 50, and thereafter the pawls 60 are engaged with the ratchet section 14. Accordingly, the lock levers 54a, 54b are further slightly displaced in the direction (radially inwardly) opposite to the above (the locked state).

When the polarity of the current to be applied to the unillustrated rotary driving source is reversed in the locked state in which the pawls 60 are engaged with the ratchet section 14 of the housing 16, the cam 80 and the sun gear 20 are rotated counterclockwise (in the direction of the arrow D) by the input shaft 28 (see FIG. 12). During this process, the rollers 76 axially attached to the cam-engaging projections 58 roll along the outer circumferential surface of the cam 80 and the guide groove entrances 86, and the rollers 76 abut against the projections having the triangular cross sections. After that, the rollers 76 are guided along the guide grooves 78 while being engaged with the projections 82 having the substantially triangular cross sections of the cam 80 (see FIG. 12).

When the rollers 76 are forcibly rolled along the guide grooves 78 having the V-shaped cross sections of the cam 80 in the locked state of the lock levers 54a, 54b in which the pawls 60 are engaged with the ratchet section 14, the force (pulling force) is generated to displace the lock levers 54a, 54b radially inwardly, and the pawls 60 of the lock levers 54a, 54b can be separated from the ratchet section 14 of the housing 16. The rollers 76 of the lock levers 54a, 54b, which are separated from the ratchet section 14, are restored to the initial position while retained by the guide grooves 78 without being disengaged from the guide grooves 78.

Therefore, when the lock release mechanism 72 is provided, the force is applied for pulling the lock levers 54a, 54b radially inwardly. Thus, it is possible to release the lock levers 54a, 54b from the locked state easily and forcibly.

Figure 13:
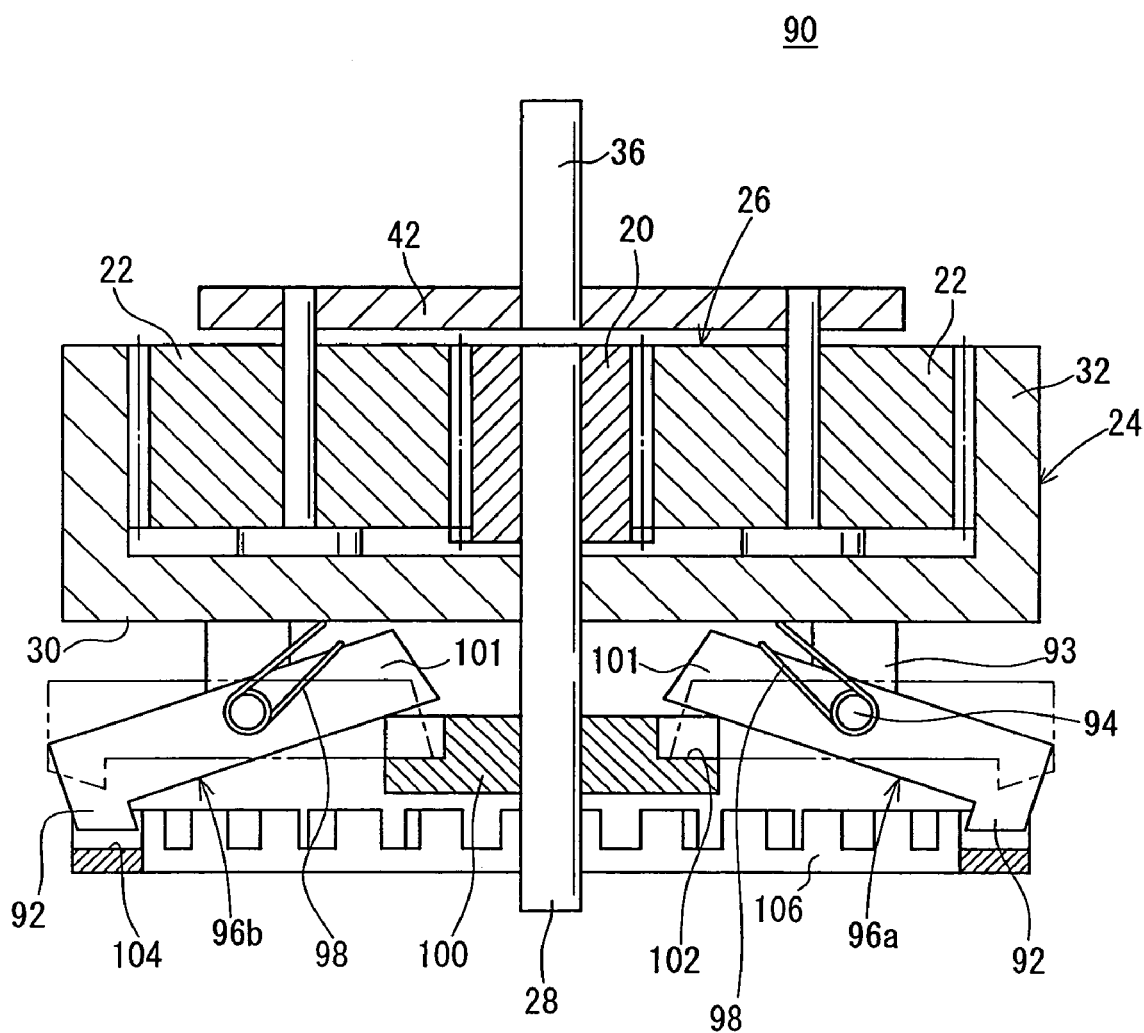
FIG. 13 is a lateral sectional view illustrating an automatic reduction-ratio changing apparatus according to a third embodiment of the present invention.

Next, an automatic reduction-ratio changing apparatus 90 according to a third embodiment of the present invention is shown in FIG. 13.

The automatic reduction-ratio changing apparatus 90 according to the third embodiment comprises lock levers 96a, 96b which have bent pawls 92 disposed at first ends and which are provided tiltably about the support points of pins 94 axially attached to attachment sections 93 connected to the wall section of the internal gear 24, and return springs 98 which are fastened to the pins 94 and which are bent in substantially U-shaped configurations. The return spring 98 has its one end which abuts against the wall section of the internal gear 24, and the other end which is fastened to the lock lever 96a, 96b. The spring forces (pressing forces) of the return springs 98 urge the lock levers 96a, 96b so that the lock levers 96a, 96b are substantially in parallel to the wall section 30 of the internal gear 24.

A pair of cam grooves 102, with which ends 101 of the lock levers 96a, 96b are engageable, are formed on the outer circumference of a cam 100 so that the cam grooves 102 are separated from each other by 180 degrees circumferentially. A plate 106 is provided, which is formed with a plurality of recesses 104 separated from each other by predetermined angles circumferentially. The plate 106 is fixed to the housing 16. The cam grooves 102 and the recesses 104 are recessed substantially in parallel to the axis of the input shaft 28.

In this arrangement, the ends 101 of the lock levers 96a, 96b are disengageable from the cam grooves 102 to run up onto the flat surface portion of the cam 100 via unillustrated inclined surfaces. Therefore, when the ends 101 of the lock levers 96a, 96b are disengaged and pushed up from the cam grooves 102, and the lock levers 96a, 96b are tilted about the supports points of the pins 94, then the pawls 92 of the lock levers 96a, 96b are engaged with the recesses 104 (the locked state).

Next, an automatic reduction-ratio changing apparatus 110 according to a fourth embodiment of the present invention is shown in FIGS. 14 to 17.

Figure 15:
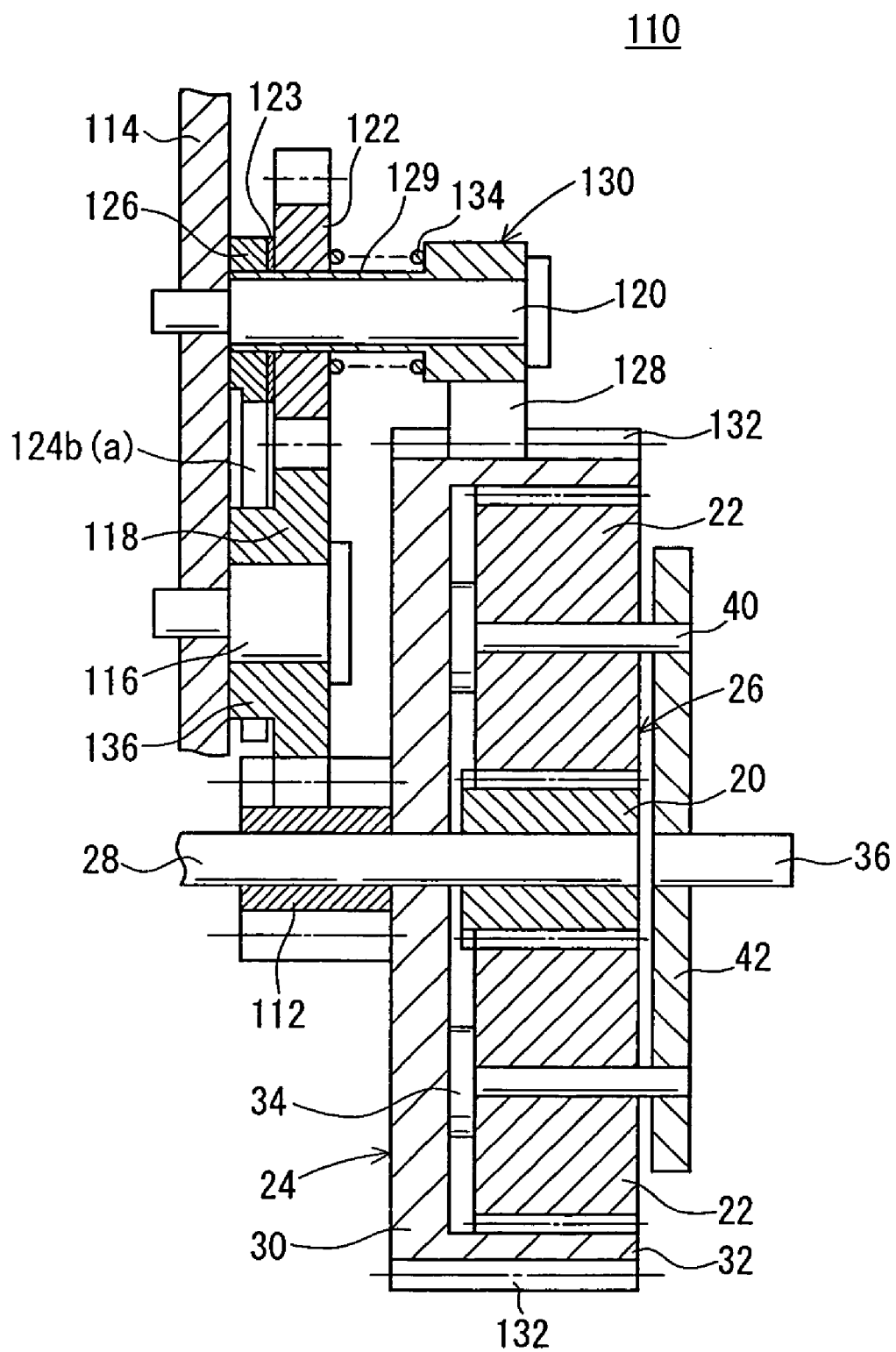
FIG. 15 is a vertical sectional view illustrating the automatic reduction-ratio changing apparatus shown in FIG. 14.
Figure 16:
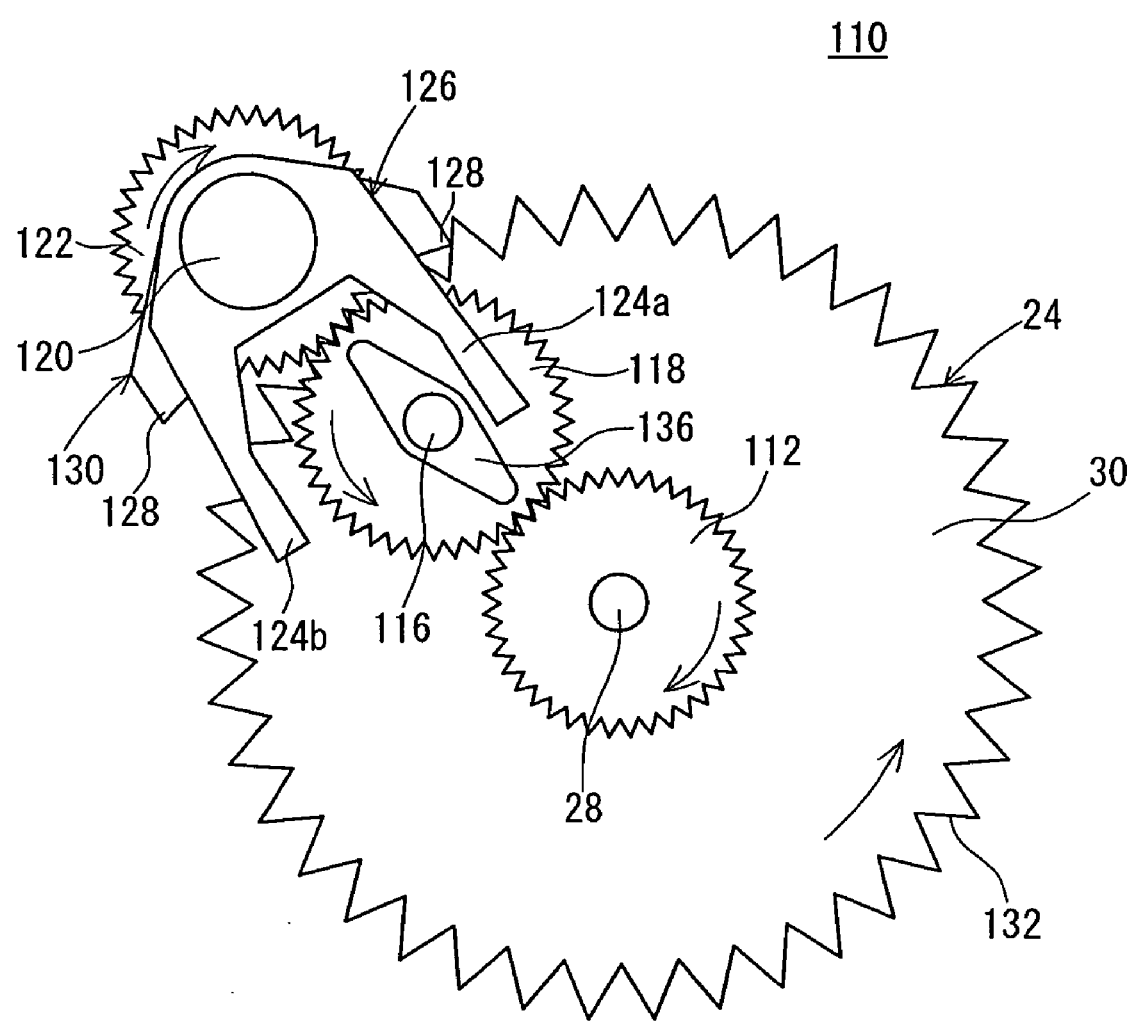
FIG. 16 is a side view illustrating a locked state in which a lock member makes swinging movement starting from an initial position shown in FIG. 14, and a pawl is engaged with an outer circumferential ratchet section.

As shown in FIG. 15, the automatic reduction-ratio changing apparatus 110 according to the fourth embodiment comprises a first gear 112 which is connected to the input shaft 28 and which is rotatable together with the sun gear 20, a fixed plate 114 which is fixed to the housing 16, a second gear 118 which is rotatably supported by a first shaft member 116 axially attached to the fixed plate 114 and which is formed with gear teeth to be meshed with gear teeth of the first gear 112, and a third gear 122 which is rotatably supported by a second shaft member 120 axially attached to the fixed plate 114 and which has gear teeth to be meshed with gear teeth of the second gear 118.

A friction member 123 made of, for example, felt or the like and an engaging member 126 having a pair of arms 124a, 124b (see FIG. 14) branched in a substantially U-shaped form are axially supported between the third gear 122 and the fixed plate 114 by the second shaft member 120. The pair of arms 124a, 124b are swingable about the support point of the second shaft member 120.

A lock member 130 is installed to the second shaft member 120 so that the outer circumferential surface thereof is surrounded by the lock member 130. The lock member 130 has pawls 128 which are axially supported swingably about the support point of the second shaft member 120, and a cylindrical boss section 129 which is forcibly inserted into a hole of the engaging member 126 and which is connected integrally with the engaging member 126. The pawls 128 are engageable with an outer circumferential ratchet section 132 formed on the outer circumferential surface of the flange section 32 of the internal gear 24. The pawls 128 of the lock member 130 and the engaging member 126 connected by the boss section 129 are rotatable jointly about the support point of the second shaft member 120.

A spring member 134 of a coil spring is interposed between the third gear 122 and the lock member 130. The third gear 122 is pressed against the engaging member 126 via the friction member 123 by the repulsive force of the spring member 134. A desired frictional force (small frictional force) is applied between the third gear 122 and the engaging member 126.

Figure 14:
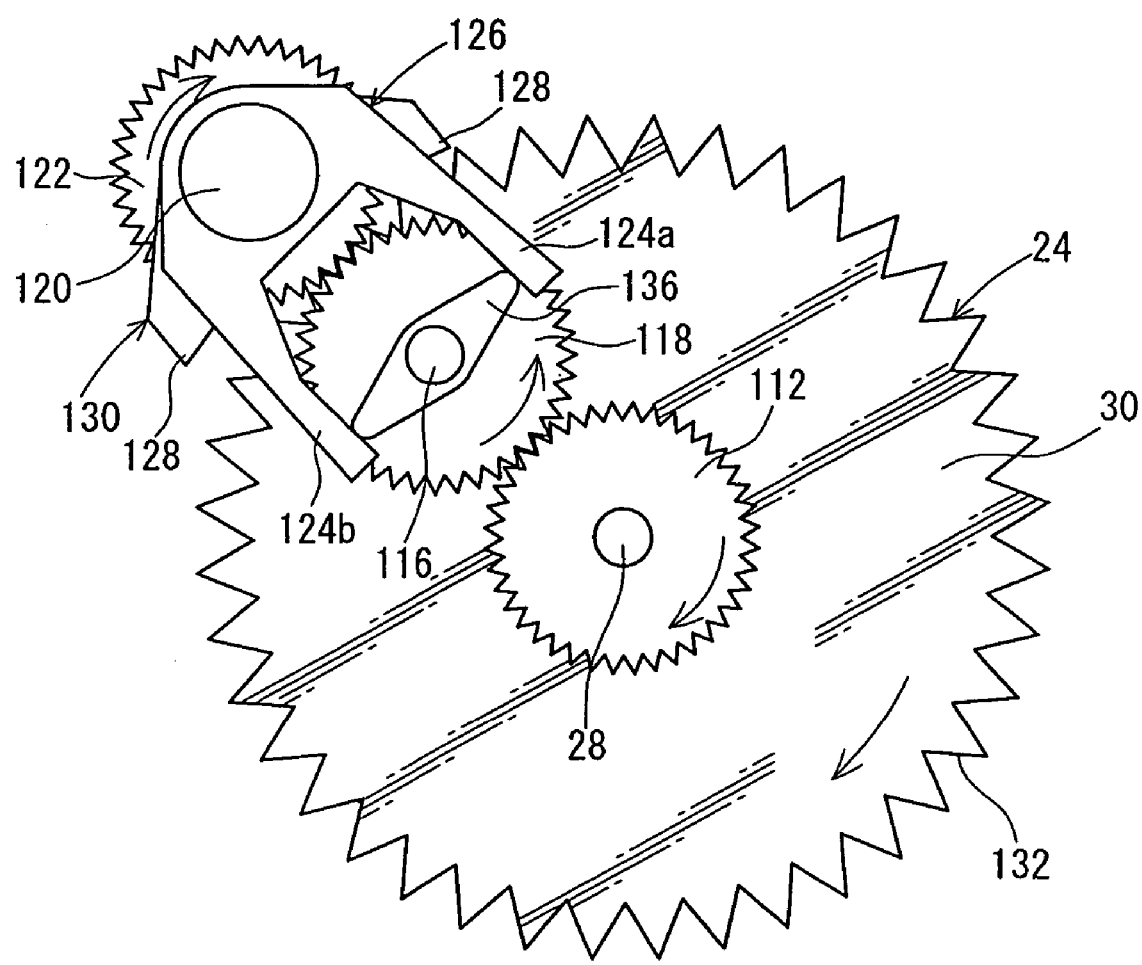
FIG. 14 is a schematic constitutive side view illustrating an automatic reduction-ratio changing apparatus according to a fourth embodiment of the present invention.

As shown in FIG. 14, a cam 136 having a rhombic cross section is formed to expand integrally on one side of the second gear 118. The cam 136 is rotatable together with the second gear 118 about the center of the first shaft member 116. The longer diagonal line of the cam 136 in the rhombic cross section is slightly shorter than the inner distance between the pair of arms 124a, 124b.

The operation of the automatic reduction-ratio changing apparatus 110 according to the fourth embodiment will be schematically explained. As shown in FIG. 14, the internal gear 24 is not locked by the pawls 128 of the lock member 130 at the initial position. The sun gear 20 and the internal gear 24 are rotated clockwise.

Therefore, at the initial position, as shown in FIG. 14, the first gear 112 is rotated clockwise together with the sun gear 20. The second gear 118, which is meshed with the first gear 112, is rotated counterclockwise together with the cam 136. The third gear 122 meshed with the second gear 118 is rotated clockwise. As a result, the lock member 130 and the engaging member 126 axially supported by the second shaft member 120 are urged to rotate clockwise by the repulsive force (pressing force) of the spring member 134 and the small frictional force exerted by the friction member 123. However, the internal gear 24 is not locked by the pawl 128 of the lock member 130, because the outer circumferential ratchet section 132 of the internal gear 24 is rotated clockwise.

When the number of revolutions of the output shaft 36 is smaller than the number of revolutions of the input shaft 28 by the load torque applied by the actuator provided on the output shaft 36 at the initial position, the internal gear 24 is rotated counterclockwise oppositely to the above. The pawl 128 of the lock member 130, which has been urged clockwise under the frictional force exerted by the spring member 134, is engaged with the outer circumferential ratchet section 132 of the internal gear 24 (the locked state, see FIG. 16). In this situation, the pair of arms 124a, 124b of the engaging member 126 also swing slightly clockwise by means of the frictional force exerted by the spring member 134 in the same manner as the pawl 128 of the lock member 130.

Figure 17:
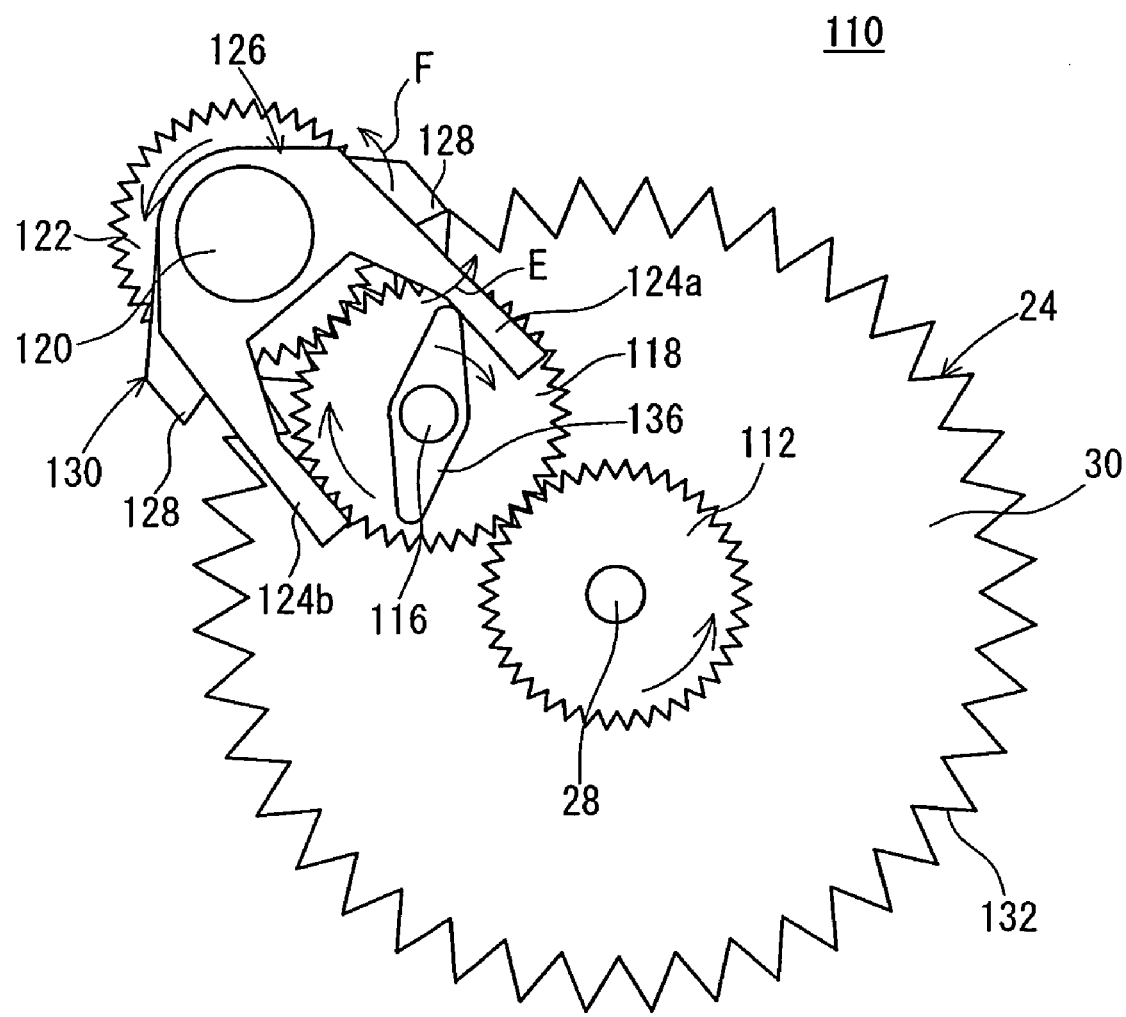
FIG. 17 is a side view in which the pawl of the lock member is separated from the outer circumferential ratchet section to release from the locked state.

When the polarity of the current to be applied to the unillustrated rotary driving source is reversed in the locked state in which the pawl 128 of the lock member 130 is engaged with the outer circumferential ratchet section 132 of the internal gear 24 to stop the rotation of the internal gear 24, the first gear 112 and the sun gear 20 are rotated counterclockwise by the input shaft 28. During this process, as shown in FIG. 17, the second gear 118 meshed with the first gear 112 is rotated clockwise together with the cam 136, and the third gear 122 meshed with the second gear 118 is rotated counterclockwise. Therefore, when the third gear 122 is rotated counterclockwise, the lock member 130 and the engaging member 126 axially supported by the second shaft member 120 are urged to rotate counterclockwise by the repulsive force of the spring member 134 and the frictional force exerted by the friction member 123.

In this situation, as shown in FIG. 17, the end of the cam 136 rotating clockwise together with the second gear 118 is engaged with one arm 124a of the engaging member 126 to press the arm 124a in the direction of the arrow E. Therefore, the pawl 128 of the lock member 130 integrally connected to the engaging member 126 swings in the direction of the arrow F to separate from the outer circumferential ratchet section 132 of the internal gear 24. Accordingly, the internal gear 24 is released from the locked state.

Next, an automatic reduction-ratio changing apparatus 140 according to a fifth embodiment of the present invention is shown in FIGS. 18 to 22.

Figure 18:
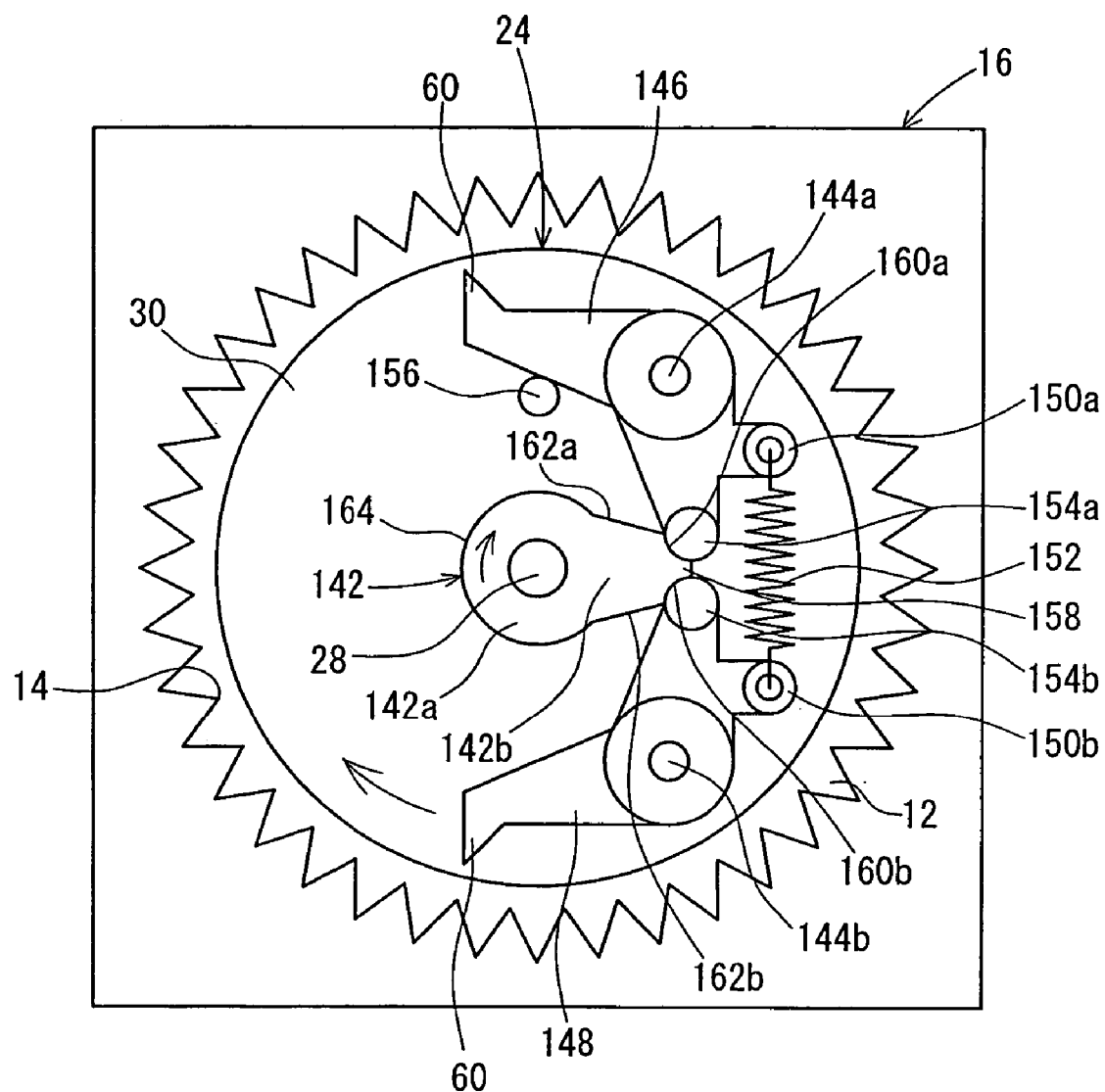
FIG. 18 is a schematic constitutive side view illustrating an automatic reduction-ratio changing apparatus according to a fifth embodiment of the present invention.

As shown in FIG. 18, the automatic reduction-ratio changing apparatus 140 according to the fifth embodiment comprises a cam member 142 which is rotatable together with the input shaft 28, a lock lever 146 which is axially attached to the wall section 30 of the internal gear 24 by a pin 144a and which is formed with a pawl 60 for engaging with the ratchet section 14 of the housing 16, a torque limiter lever 148 which is axially attached to the wall section 30 of the internal gear 24 by a pin 144b at a position symmetrical to the lock lever 146, and a spring member 152 which is fastened to projections 150a, 150b of the lock lever 146 and the torque limiter lever 148 respectively so that the lock lever 146 and the torque limiter lever 148, which are spaced from each other by a predetermined distance, are pulled in directions to approach one another.

The pair of the lock lever 146 and the torque limiter lever 148 are installed to the internal gear 24 by the pins 144a, 144b. Therefore, the lock lever 146 and the torque limiter lever 148 are rotatable together with the internal gear 24.

The lock lever 146 and the torque limiter lever 148 have a pair of columnar projections 154a, 154b which face one another while being spaced from each other by a predetermined distance. The lock lever 146 and the torque limiter lever 148 are rotatable by predetermined angles about the supports points of pins 144a, 144b. A stopper pin 156 secured to the internal gear 24 is provided at a portion disposed closely to the lock lever 146. When the lock lever 146 is fastened by the stopper pin 156, the counterclockwise rotation about the support point of the pin 144a is limited.

The cam member 142 has a composite shape obtained by integrally combining a circular arc-shaped section 142a and a protruding tab 142b having widths gradually narrowed radially outwardly. The circumferential surface of the cam member 142 includes a pair of curved surface sections 160a, 160b which are formed on both sides of an end 158 of the protruding tab 142b and with which the pair of columnar projections 154a, 154b of the lock lever 146 and the torque limiter lever 148 are engageable, a pair of straight side surface sections 162a, 162b which are continued from the curved surface sections 160a, 160b, and a circular arc-shaped surface section 164 which is continued to the side surface sections 162a, 162b. When the pair of columnar projections 154a, 154b of the lock lever 146 and the torque limiter lever 148 may be rollers, it is possible to obtain the stable frictional force between the columnar projections 154a, 154b and the curved surface sections 160a, 160b.

The pawl 60 is formed at the end of the torque limiter lever 148 which has the shape symmetrical to the lock lever 146. However, the pawl 60 of the torque limiter lever 148 is not used to stop the rotation of the internal gear 24 in order to lock the internal gear 24 when the internal gear 24 is rotated counterclockwise as described later on.

The operation of the automatic reduction-ratio changing apparatus 140 according to the fifth embodiment will be schematically explained. As shown in FIG. 18, the internal gear 24 is not locked at the initial position, because the pawl 60 of the lock lever 146 is not engaged with the ratchet section 14 of the housing 16. The sun gear 20 (input shaft 28) and the internal gear 24 are rotated clockwise.

That is, at the initial position, as shown in FIG. 18, the pair of columnar projections 154a, 154b of the lock lever 146 and the torque limiter lever 148 are engaged with the pair of curved surface sections 160a, 160b formed at the end 158 of the protruding tab 142b of the cam member 142. This time, the end 158 of the protruding tab 142b of the cam member 142 is retained between the pair of columnar projections 154a, 154b.

When the number of revolutions of the output shaft 36 becomes smaller than the number of revolutions of the input shaft 28 by the load torque applied from the actuator provided on the output shaft 36 at the initial position as described above, the internal gear 24 is rotated counterclockwise which is opposite to the above. The end 158 of the protruding tab 142b of the cam member 142 is disengaged from the position between the pair of columnar projections 154a, 154b of the lock lever 146 and the torque limiter lever 148. The spring force (pulling force) of the spring member 152 interposed between the lock lever 146 and the torque limiter lever 148 establishes the force for the end 158 of the protruding tab 142b of the cam member 142 to be disengaged from the position between the pair of columnar projections 154a, 154b, i.e., the load torque to be transmitted to the internal gear 24. When the load torque transmitted from the actuator exceeds a preset value, the end 158 of the protruding tab 142b of the cam member 142 is disengaged from the position between the pair of columnar projections 154a, 154b.

Figure 19:
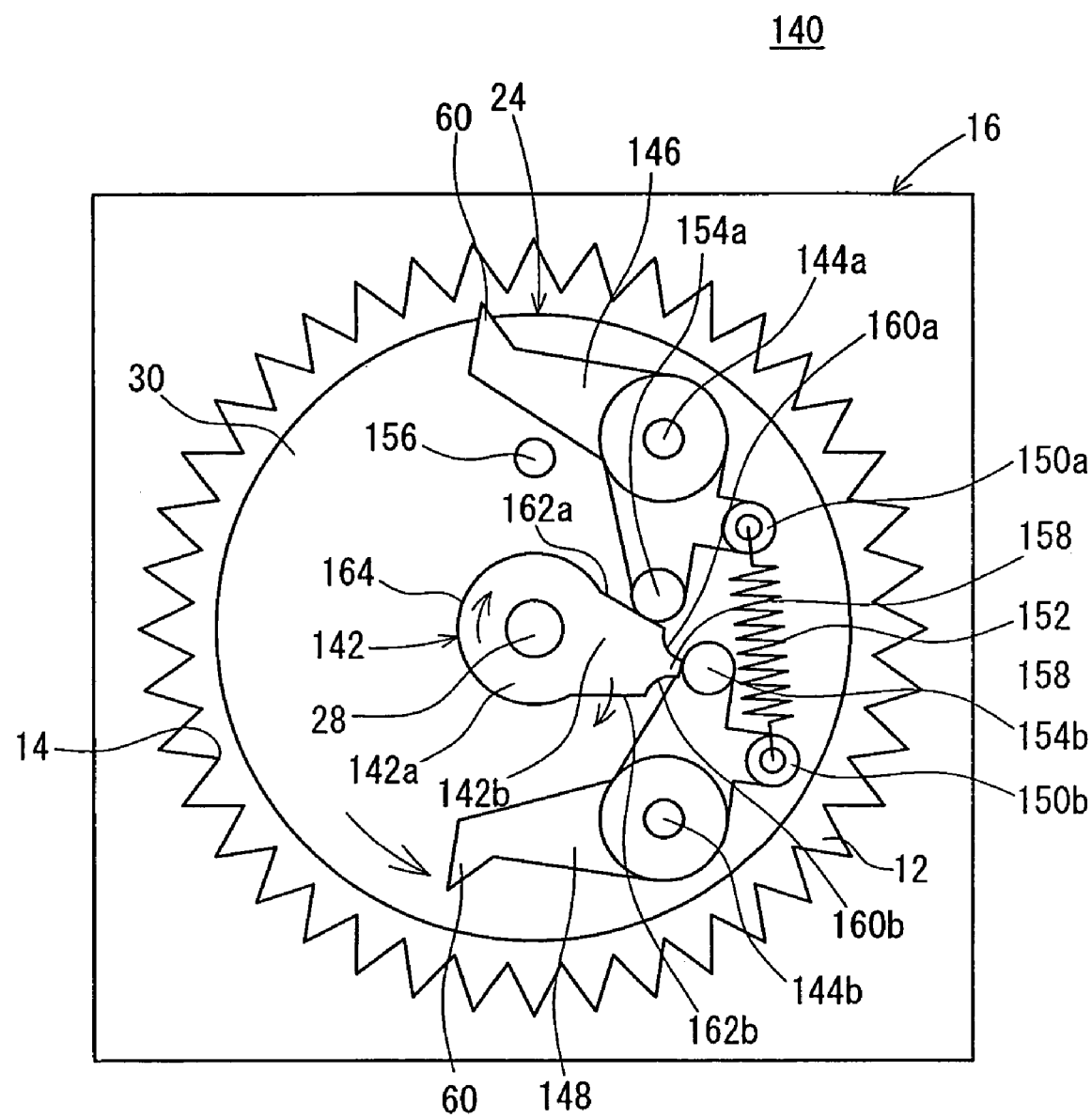
FIG. 19 is a side view illustrating a state in which the internal gear is rotated counterclockwise starting from the initial position shown in FIG. 18.

In this situation, as shown in FIG. 19, the columnar projection 154a of the lock lever 146 is disengaged from the curved surface section 160a of the cam member 142, and the columnar projection 154a is engaged with the straight side surface section 162a. Accordingly, the columnar projection 154a is rotated clockwise about the support point of the pin 144a.

Figure 20:
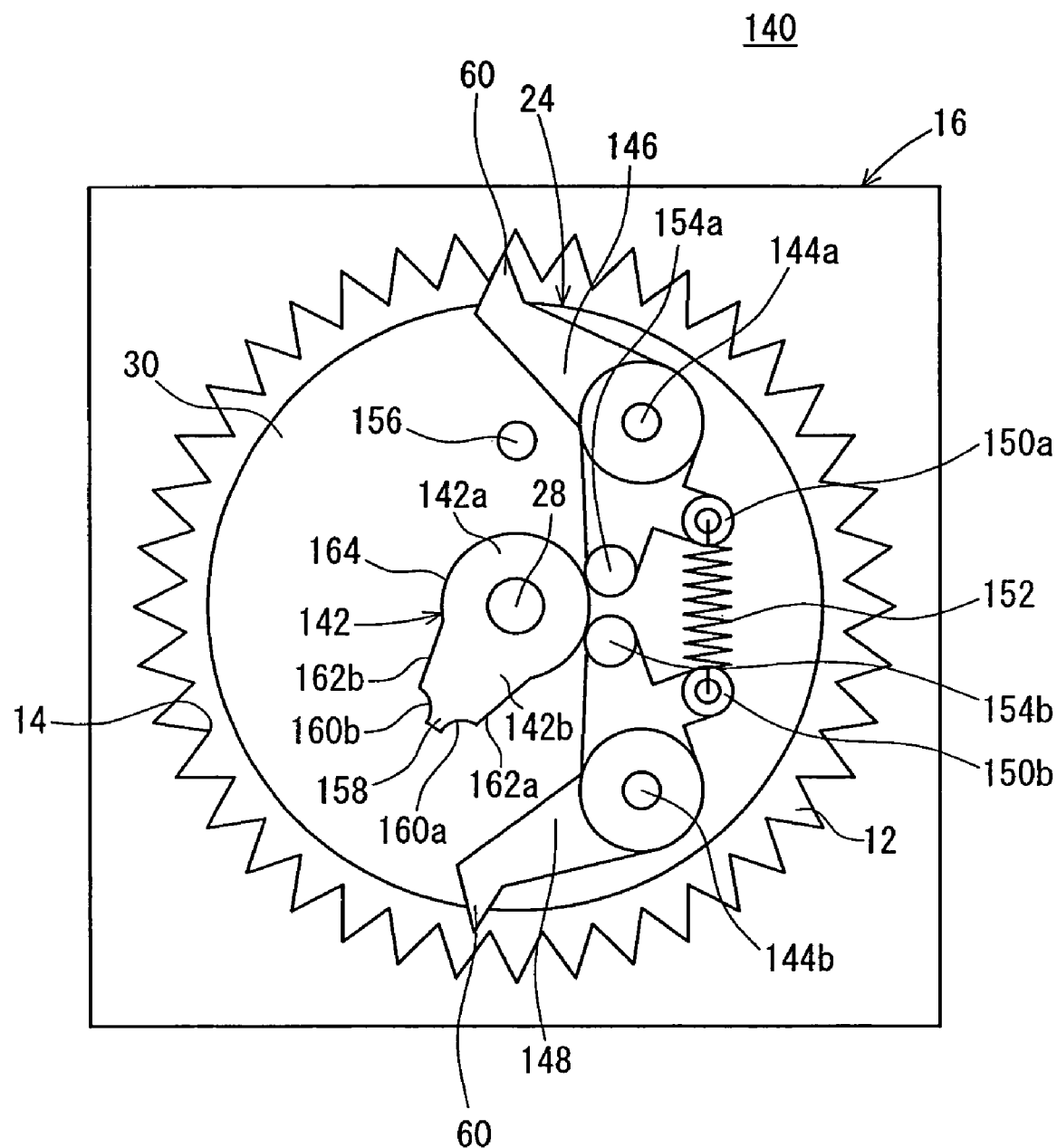
FIG. 20 is a side view illustrating a locked state in which a lock lever is rotated starting from the state shown in FIG. 19, and a pawl is engaged with a ratchet section.

The columnar projection 154a of the lock lever 146 is moved along the circumferential surface of the cam member 142. The columnar projection 154a of the lock lever 146 is engaged with the circular arc-shaped surface section 164 as shown in FIG. 20, and the lock lever 146 is further rotated clockwise about the support point of the pin 144a. Accordingly, the pawl 60 of the lock lever 146 is engaged with the ratchet section 14 (the locked state).

When the polarity of the current to be applied to the unillustrated rotary driving source is reversed in the locked state in which the pawl 60 of the lock lever 146 is engaged with the ratchet section 14 of the housing 16 to stop the rotation of the internal gear 24 as described above, the cam member 142 and the sun gear 20 (input shaft 28) are rotated counterclockwise by the input shaft 28.

Figure 21:
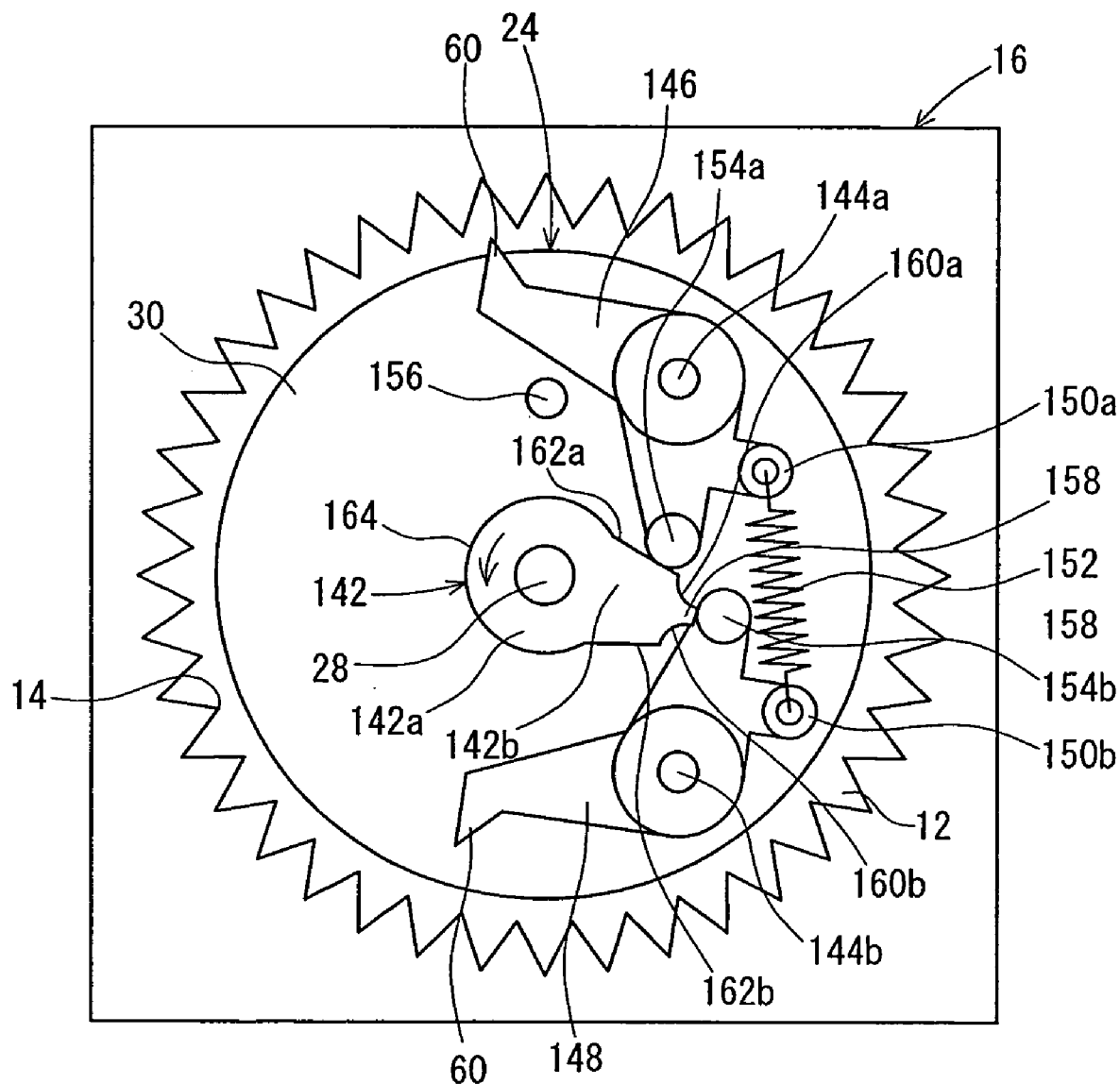
FIG. 21 is a side view illustrating a state in which the pawl of the lock lever is separated from the ratchet section to release from the locked state.

In this situation, as shown in FIG. 21, the side surface section 162a of the protruding tab 142b of the cam member 142 rotating counterclockwise by the input shaft 28 is engaged with the columnar projection 154a of the lock lever 146, and the columnar projection 154a is pressed upwardly. Therefore, the force in the counterclockwise direction is applied to the lock lever 146 about the support point of the pin 144a. Accordingly, the pawl 60 of the lock lever 146 is separated from the ratchet section 14 of the housing 16, and the internal gear 24 is released from the locked state.

Figure 22:
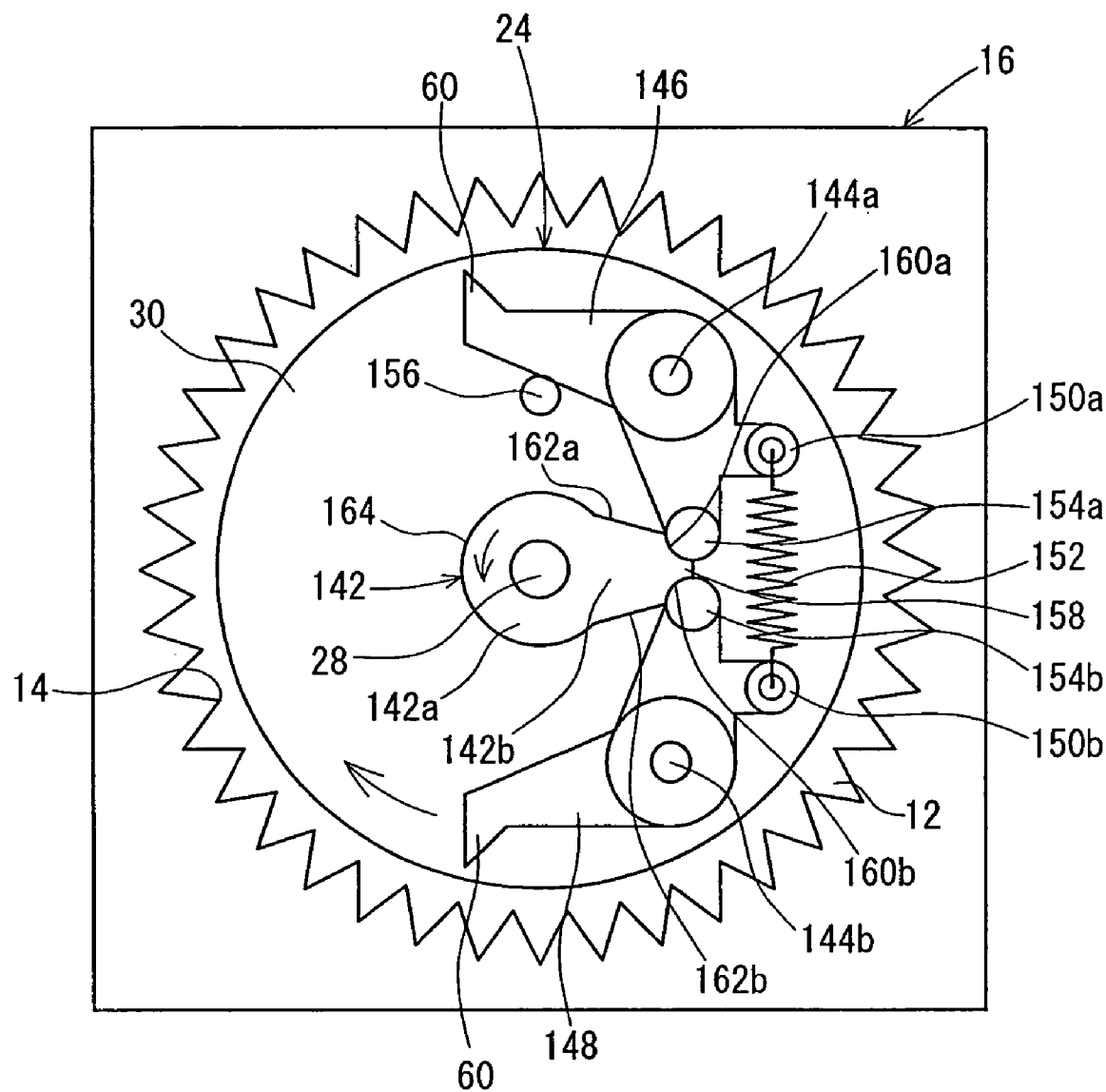
FIG. 22 is a side view in which the locked state is released to restore to the initial position.

When the cam member 142 is further rotated counterclockwise about the support point of the input shaft 28, the initial position is given as shown in FIG. 22, in which the end 158 of the protruding tab 142b of the cam member 142 is interposed and retained between the pair of columnar projections 154a, 154b of the lock lever 146 and the torque limiter lever 148.

When the locked state is released, the lock lever 146 is rotated counterclockwise about the support point of the pin 144a. However, when the lock lever 146 abuts against the stopper pin 156, the rotary action is limited and restored to the initial position.

When in the apparatus the internal gear 24 is rotated clockwise by the load torque applied from the actuator, the stopper pin 156 may be installed on the torque limiter lever 148, and the pawl 60 of the torque limiter lever 148 may be engaged with the ratchet section 14 of the housing 16 to establish the locked state as well.

Figure 23:
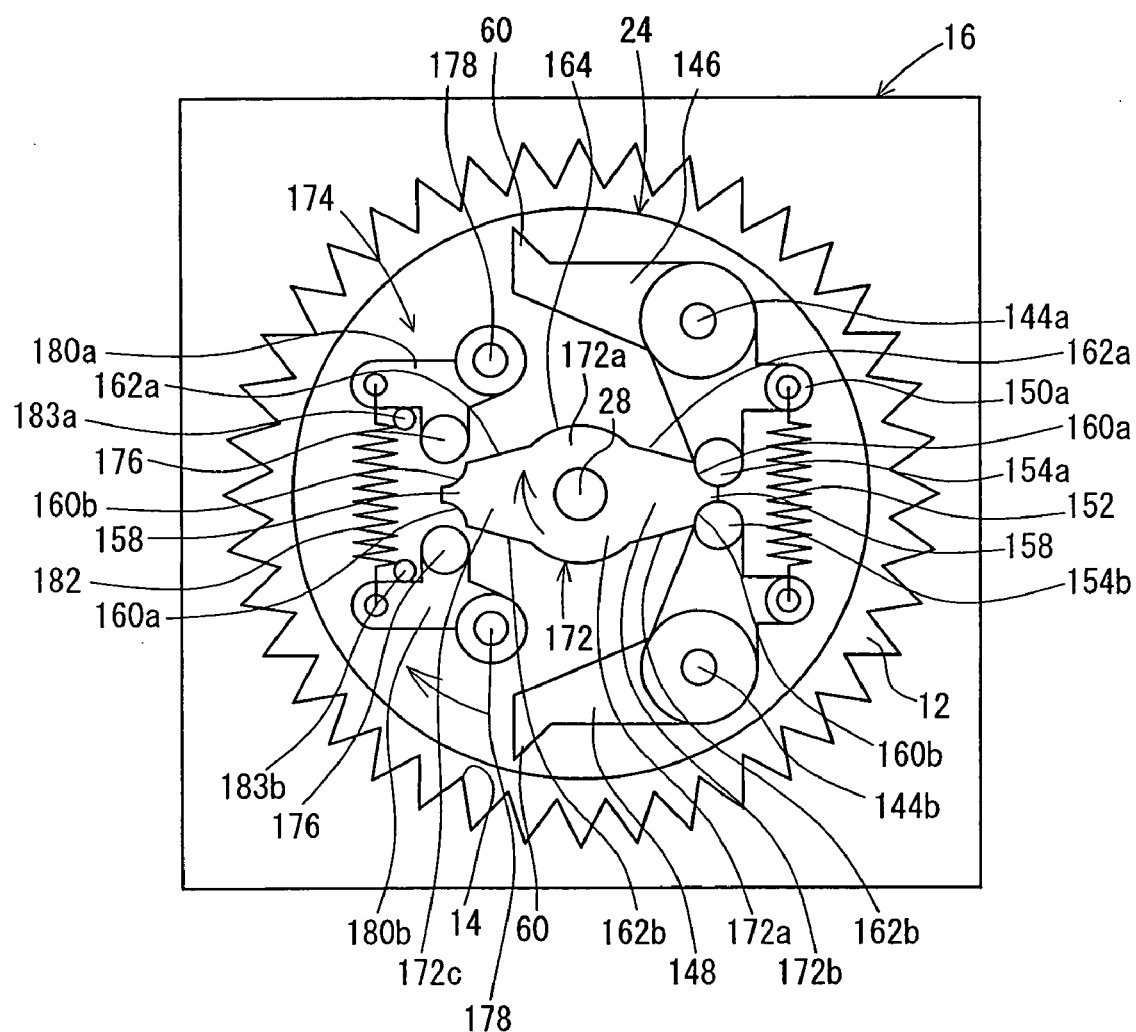
FIG. 23 is a schematic constitutive side view illustrating an automatic reduction-ratio changing apparatus according to a sixth embodiment of the present invention.
Figure 24:
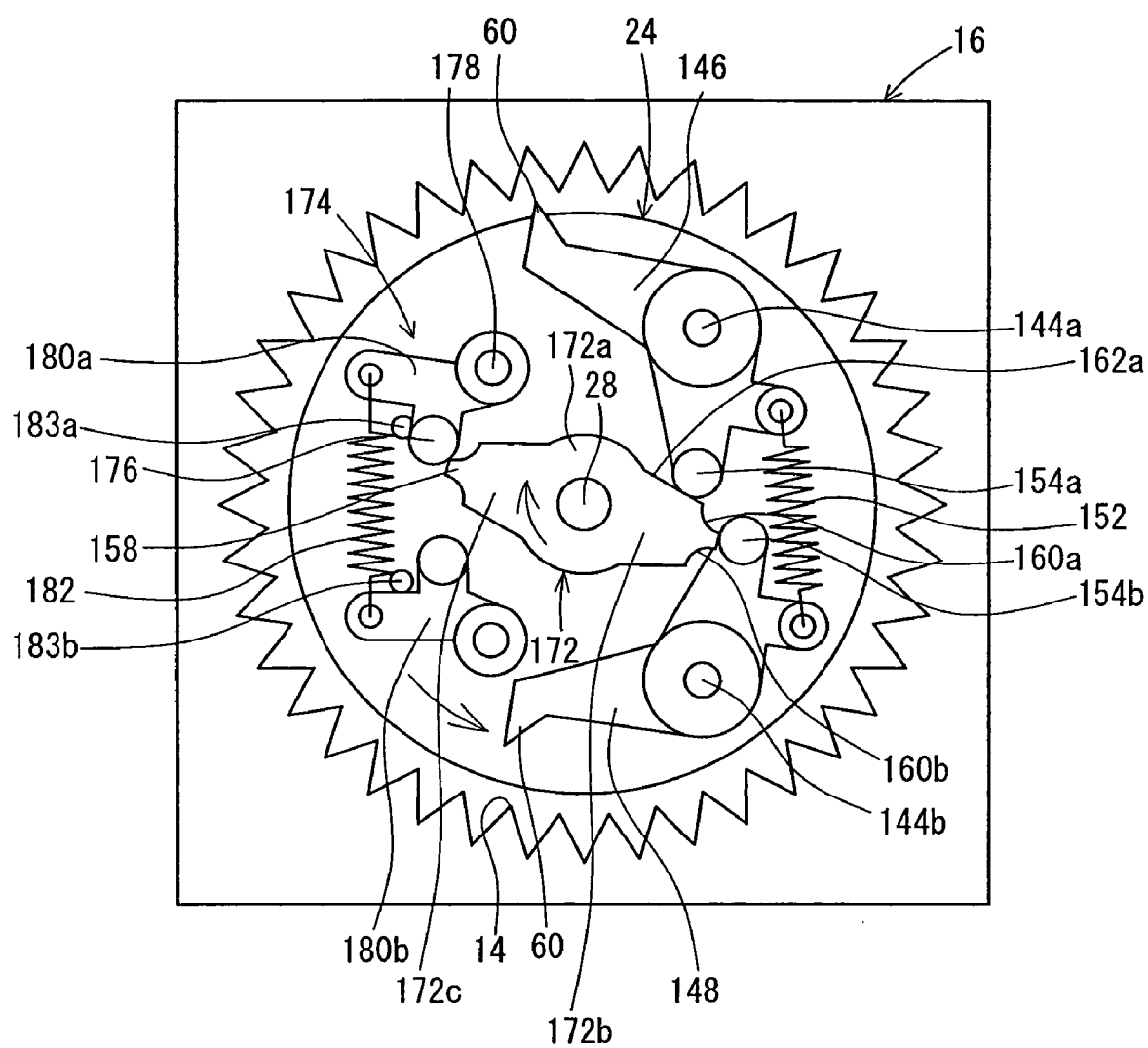
FIG. 24 is a side view in which the internal gear is rotated counterclockwise starting from the initial position shown in FIG. 23.
Figure 25:
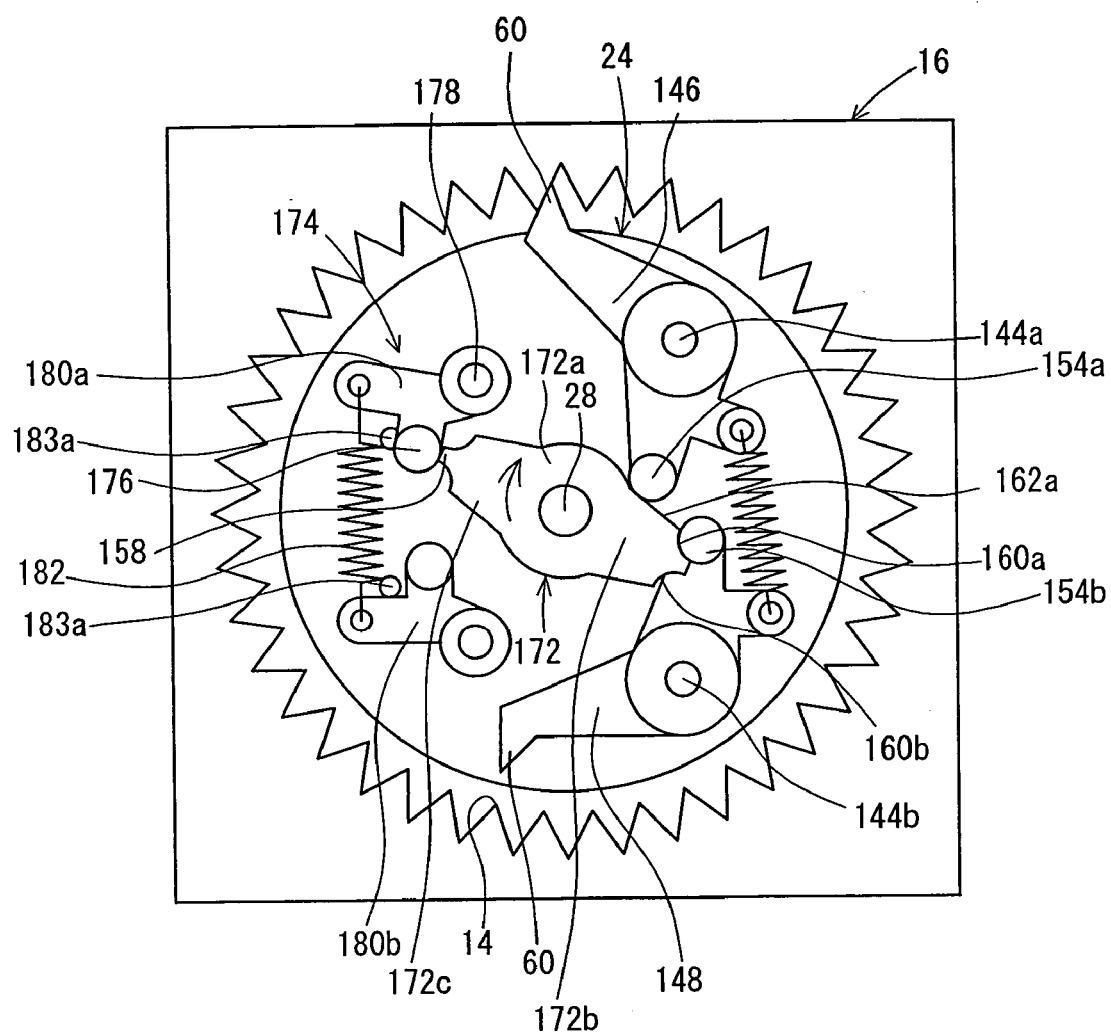
FIG. 25 is a side view illustrating a locked state in which a lock lever is rotated starting from the state shown in FIG. 24, and a pawl is engaged with a ratchet section.

Next, an automatic reduction-ratio changing apparatus 170 according to a sixth embodiment of the present invention is shown in FIGS. 23 to 25. The constituent elements that are same as those of the automatic reduction-ratio changing apparatus 140 according to the fifth embodiment are designated by the same reference numerals, and detailed explanation thereof will be omitted.

The automatic reduction-ratio changing apparatus 170 according to the sixth embodiment is different from the automatic reduction-ratio changing apparatus 140 according to the fifth embodiment in that a cam member 172 is formed and shaped by a pair of protruding tabs 172b, 172c which have straight forms and which are separated from each other by about 180 degrees with a circular arc-shaped section 172a being interposed between the protruding tabs 172b, 172c, and a cam-engaging mechanism 174 is provided, which is capable of engaging with the ends 158 of the protruding tabs 172b, 172c of the cam member 172 when the cam member 172 is rotated.

Owing to the pair of protruding tabs 172b, 172c which are coaxially formed with the cam member 172, the automatic reduction-ratio changing apparatus 170 is advantageous in that the angle of rotation of the cam member 172 can be decreased when the locked state is released as compared with the case in which the single protruding tab 142b is used. That is, the cam member 142 having the single protruding tab 142b requires the angle of rotation of 360 degrees at the maximum. In contrast, in the case of the cam member 172 provided with the pair of protruding tabs 172b, 172c having a straight shape, the angle of rotation is 180 degrees at the maximum.

The cam-engaging mechanism 174 comprises a pair of engaging members 180a, 180b in a symmetrical shape which have columnar engaging sections 176 to contact the ends 158 of the protruding tabs 172b, 172c of the cam member 172 and which are provided rotatably by predetermined angles about the support points of pins 178, a spring member 182 which is fastened to projections of the pair of engaging members 180a, 180b respectively and which pulls the pair of engaging members 180a, 180b in directions to approach one another, and a pair of stopper pins 183a, 183b which limit the ranges of rotation of the pair of engaging members 180a, 180b and which limit the distance between the pair of engaging members 180a, 180b pulled by the spring member 182.

The operation of the automatic reduction-ratio changing apparatus 170 according to the sixth embodiment will be schematically explained. In FIG. 23, the initial position is shown. The end 158 of one protruding tab 172b of the cam member 172 is retained between the pair of columnar projections 154a, 154b, and the end 158 of the other protruding tab 172c is separated from the pair of columnar engaging sections 176 while positioned between the pair of columnar engaging sections 176. In this state, the sun gear 20 (input shaft 28) and the internal gear 24 are rotated clockwise.

When the number of revolutions of the output shaft 36 becomes smaller than the number of revolutions of the input shaft 28 by the load torque applied from the actuator provided on the output shaft 36 at the initial position as described above, the internal gear 24 is rotated counterclockwise which is opposite to the above. The end 158 of one protruding tab 172b of the cam member 172 is disengaged from the position between the pair of columnar projections 154a, 154b, and the end 158 of the other protruding tab 172c contacts the columnar engaging section 176 of the engaging member 180a (see FIG. 24).

The columnar projection 154a of the lock lever 146 is moved along the side surface section 162a of the cam member 172. As shown in FIG. 25, the columnar projection 154b of the torque limiter lever 148 is retained by being engaged with the curved surface section 160a of one protruding tab 172b of the cam member 172. Further, the end 158 of the other protruding tab 172c is retained by being engaged with the columnar engaging section 176 of the engaging member 180a. Accordingly, the pawl 60 of the lock lever 146 is engaged with the ratchet section 14 of the housing 16 (the locked state).

The other function and effect are the same as those of the fifth embodiment, and detailed explanation thereof will be omitted.

Next, an automatic reduction-ratio changing apparatus 200 according to a seventh embodiment of the present invention is shown in FIGS. 28 to 32. The same constituent elements that are the same as those of the automatic reduction-ratio changing apparatus 10 according to the first embodiment are designated by the same reference numerals, and detailed explanation thereof will be omitted.

The automatic reduction-ratio changing apparatus 200 according to the seventh embodiment comprises a driving gear 202 which has a plurality of teeth formed circumferentially and which is rotatable together with the input shaft 28, a first cutout gear 206 having two teeth and a second cutout gear 208 having one tooth which are meshed with the teeth of the driving gear 202 and which are axially supported in a superimposed manner on the wall section 30 of the internal gear 24 by a first shaft member 204, a lock lever 212 which is axially supported rotatably by a predetermined angle on the wall section 30 of the internal gear 24 by a second shaft member 210, and a torque limiter lever 216 which is axially supported rotatably by a predetermined angle on the wall section 30 of the internal gear 24 by a third shaft member 214.

Figure 30:
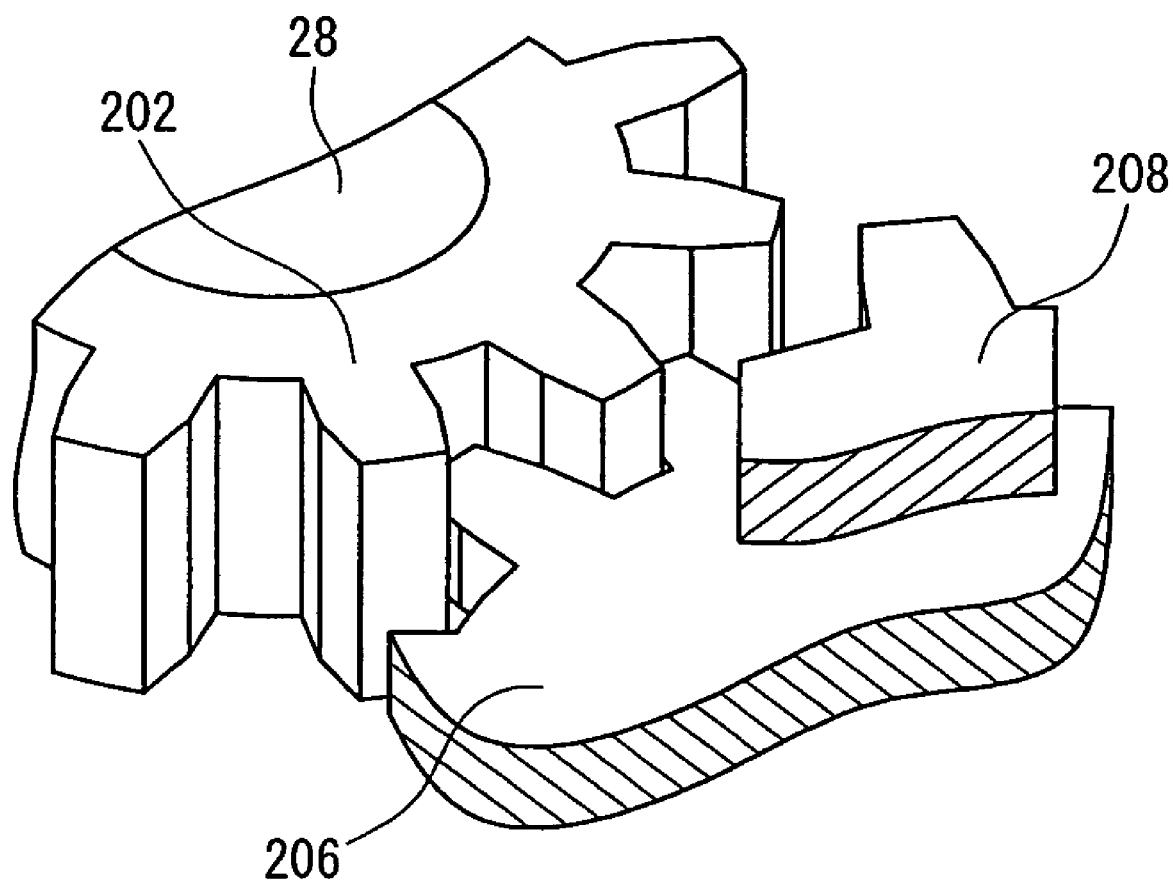
FIG. 30 is, with partial cutaway and cross section, a perspective view illustrating a meshed state between teeth of a driving gear of the automatic reduction-ratio changing apparatus shown in FIG. 28 and a first cutout gear having two teeth and a second cutout gear having one tooth.

As shown in FIG. 30, the first cutout gear 206 having two teeth and the second cutout gear 208 having one tooth are meshed while being stacked in the vertical direction with respect to the teeth of the driving gear 202. The two teeth and the one tooth are formed to have substantially an identical tooth shape respectively.

Figure 29:
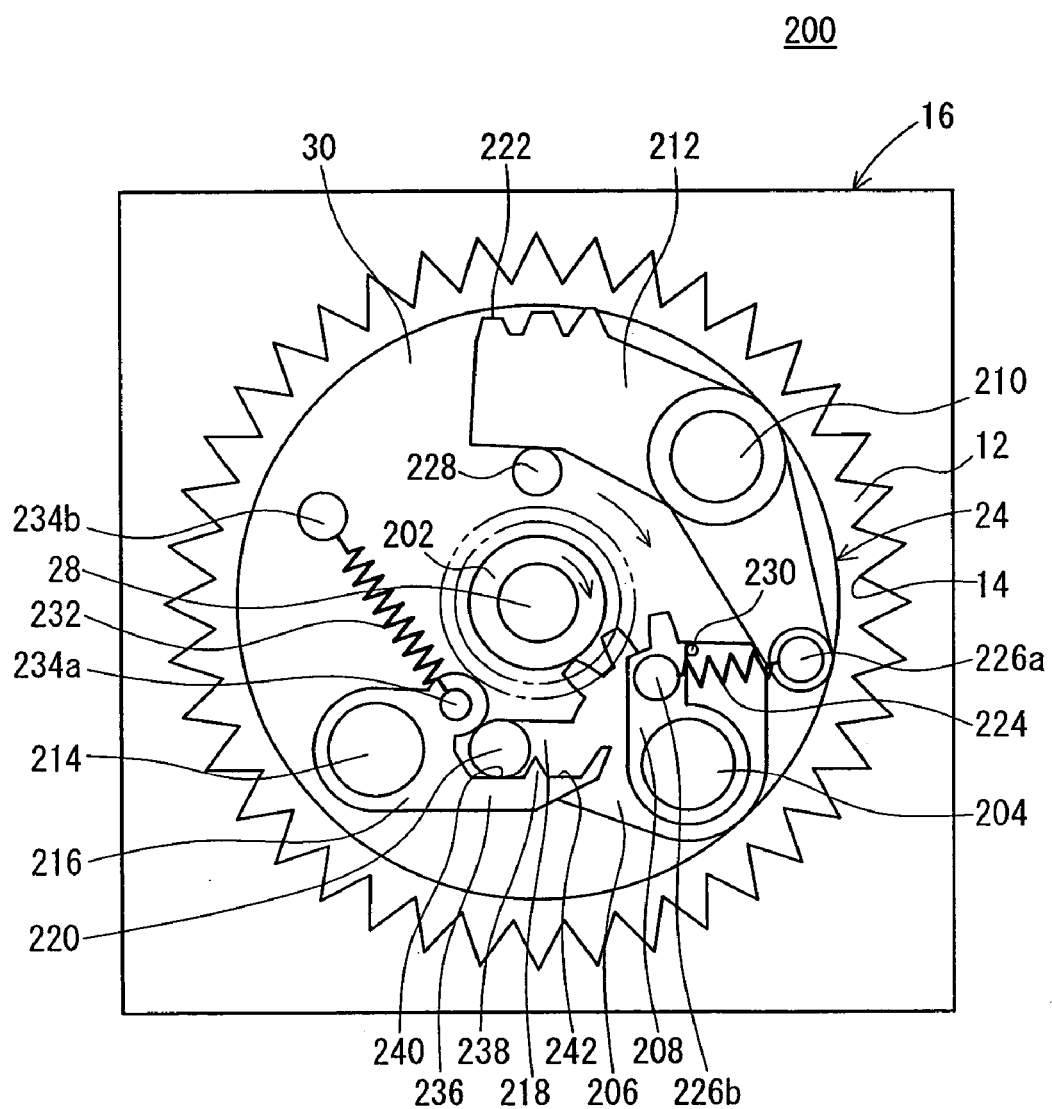
FIG. 29 is a side view at an initial position of the automatic reduction-ratio changing apparatus shown in FIG. 28.

As shown in FIG. 29, the first cutout gear 206 having two teeth is formed with a projection 218 which protrudes radially outwardly. A columnar roller 220 is axially attached to the projection 218.

A pawl 222, which is engageable with the ratchet section 14 of the housing 16, is formed at one end of the lock lever 212. A spring-fastening hole 226a, to which a first spring member 224 is fastened, is provided at the other end of the lock lever 212. A stopper member 228, which limits the rotation of the lock lever 212 counterclockwise about the support point of the second shaft member 210, is provided on the wall section 30 of the internal gear 24 disposed closely to one end of the lock lever 212.

The first spring member 224 is installed between a spring-fastening hole 226b which is connected to the second cutout gear 208 having one tooth and the spring-fastening hole 226a which is connected to the other end of the lock lever 212. The second cutout gear 208 having one tooth is urged to be rotated clockwise about the support point of the first shaft member 204 by means of the spring force (pulling force) of the first spring member 224. In this arrangement, the first cutout gear 206 having two teeth is provided with a stopper pin 230 which prevents the second cutout gear 208 having one tooth from being rotated clockwise. When the second cutout gear 208 having one tooth is fastened by the stopper pin 230, the clockwise rotation is limited.

The torque limiter lever 216 is provided with a spring-fastening hole 234a which fastens one end of a second spring member 232. The other end of the second spring member 232 is fastened by a spring-fastening member 234b which is secured to the wall section 30 of the internal gear 24. The spring force (pulling force) of the second spring member 232 is larger than the spring force (pulling force) of the first spring member 224. The second spring member 232 urges the torque limiter lever 216 so that the torque limiter lever 216 is rotated counterclockwise about the support point of the third shaft member 214.

The torque limiter lever 216 is provided with an arm 236 which is engageable with the roller 220 axially attached to the projection 218 of the first cutout gear 206 having two teeth. The arm 236 has a first engaging section 240 which retains the roller 220 at the initial position, and a second engaging section 242 which retains the roller 220 when the internal gear 24 is in the locked state by the lock lever 212. A triangular projection tab 238 is interposed between the first engaging section 240 and the second engaging section 242.

The operation of the automatic reduction-ratio changing apparatus 200 according to the seventh embodiment will be schematically explained. As shown in FIG. 29, at the initial position, the roller 220, which is axially attached to the projection 218 of the first cutout gear 206 having two teeth, is engaged with the first engaging section 240 of the arm 236 of the torque limiter lever 216, and the two teeth of the first cutout gear 206 and the one tooth of the second cutout gear 208 are not superimposed. In this state, the sun gear 20 (input shaft 28) and the internal gear 24 are rotated clockwise.

When the number of revolutions of the output shaft 36 becomes smaller than the number of revolutions of the input shaft 28 by the load torque applied from the actuator provided on the side of the output shaft 36 at the initial position as described above, the internal gear 24 is rotated counterclockwise which is opposite to the above. The first cutout gear 206 is rotated by a predetermined angle counterclockwise about the support point of the first shaft member 204 under the meshing action of the two teeth of the first cutout gear 206 and the teeth of the driving gear 202. In this situation, the roller 220, which is axially attached to the projection 218 of the first cutout gear 206, goes over the triangular projection tab 238 of the arm 236 of the torque limiter lever 216, and the roller 220 is retained by the second engaging section 242 disposed on the end. In this situation, the torque limiter lever 216 is slightly rotated clockwise about the support point of the third shaft member 214 against the spring force (pulling force) of the second spring member 232.

It is noted that the predetermined torque is the driving torque required when the first cutout gear 206 is rotated counterclockwise under the meshing action with respect to the teeth of the driving gear 202, and the roller 220, which is axially attached to the projection 218, goes over the triangular projection tab 238 of the arm 236 of the torque limiter lever 216.

Figure 31:
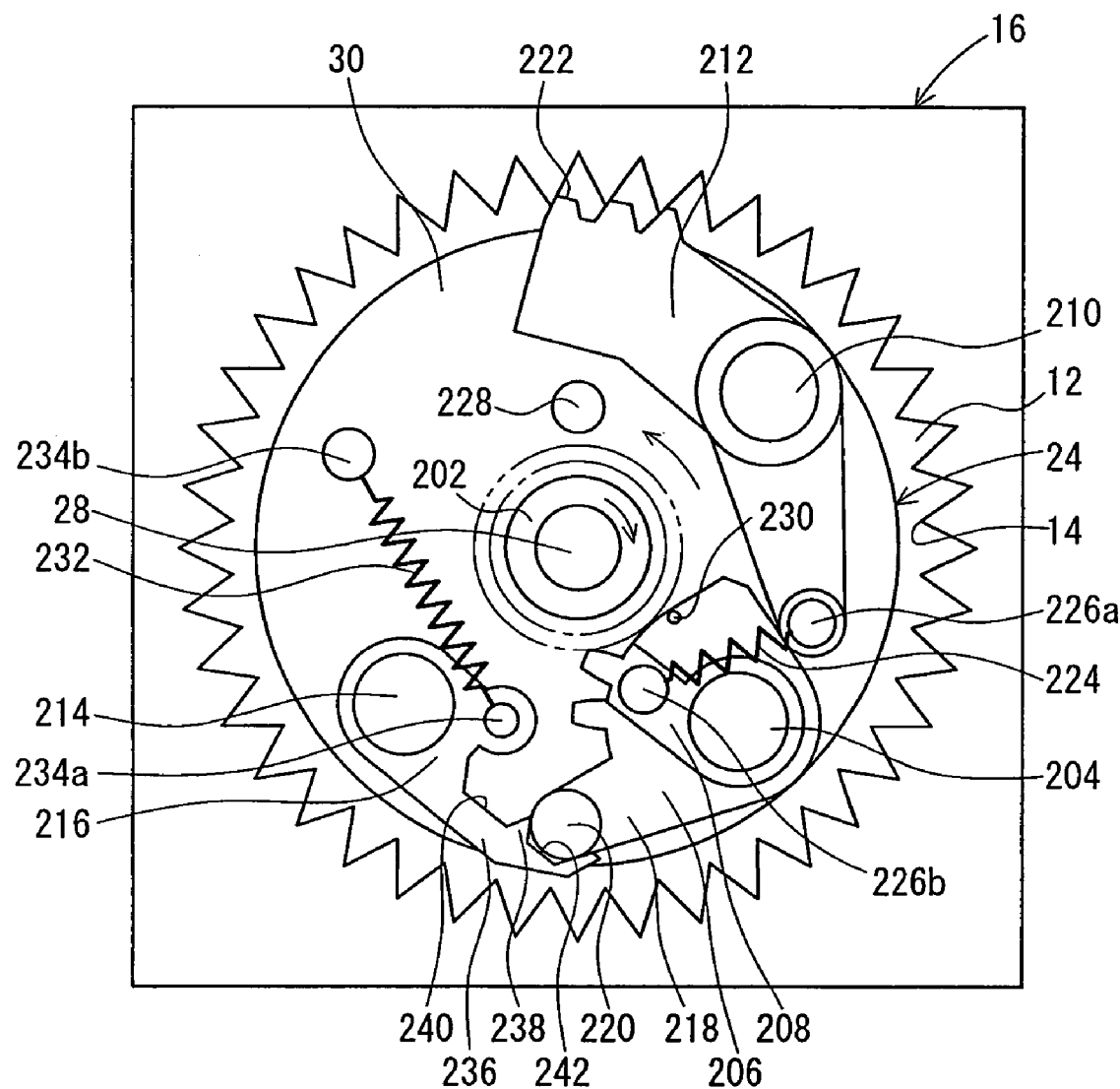
FIG. 31 is a side view illustrating a locked state of the automatic reduction-ratio changing apparatus shown in FIG. 28.

Substantially simultaneously, the one tooth of the second cutout gear 208 fastened to the stopper pin 230 is meshed with the teeth of the driving gear 202, and the second cutout gear 208 is rotated by a predetermined angle counterclockwise about the support point of the first shaft member 204 in which the one tooth of the second cutout gear 208 and one of the two teeth of the first cutout gear 206 are superimposed (see FIG. 31).

Therefore, the lock lever 212, which is pulled by the spring force of the first spring member 224, is slightly rotated clockwise about the support point of the second shaft member 210. As shown in FIG. 31, the pawl 222 of the lock lever 212 is engaged with the ratchet section 14 of the housing 16 (the locked state).

When the polarity of the current to be applied to the unillustrated rotary driving source is reversed in the locked state in which the pawl 222 of the lock lever 212 is engaged with the ratchet section 14 of the housing 16 to stop the rotation of the internal gear 24 as described above, the sun gear 20 and the driving gear 202 are rotated counterclockwise by the input shaft 28.

Figure 32:
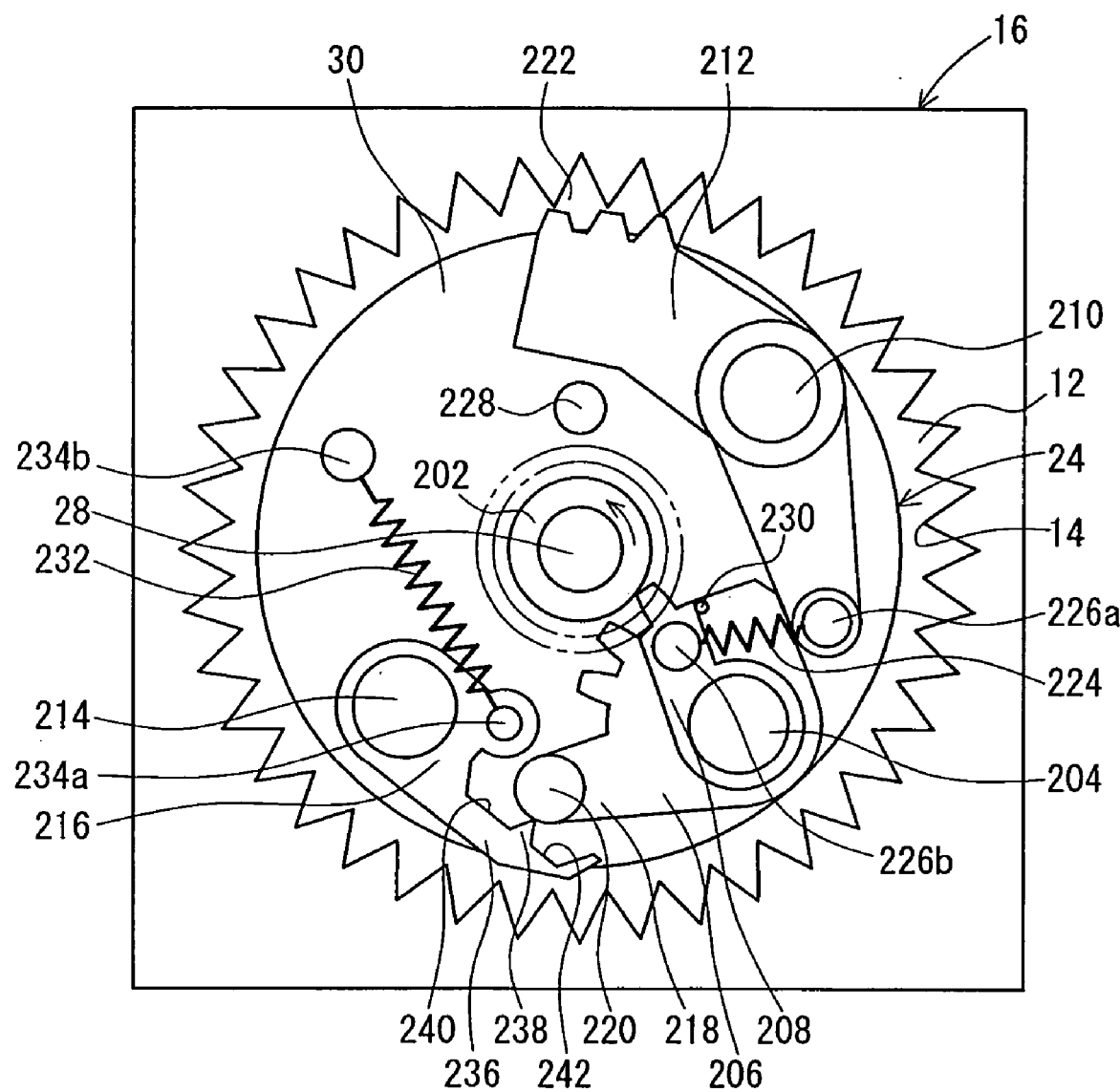
FIG. 32 is a side view illustrating a lock release state of the automatic reduction-ratio changing apparatus shown in FIG. 28.

In this situation, as shown in FIG. 32, when the one tooth of the second cutout gear 208 is meshed with the teeth of the driving gear 202 to rotate clockwise by a predetermined angle about the support point of the first shaft member 204, the second cutout gear 208 presses the stopper pin 230. The two teeth of the first cutout gear 206 are meshed with the teeth of the driving gear 202 to rotate clockwise by a predetermined angle about the support point of the first shaft member 204. In this situation, the roller 220, which is axially attached to the projection 218 of the first cutout gear 206, goes over the triangular projection tab 238, and the roller 220 is retained by the first engaging section 240 disposed on the inner side to restore to the initial position.

Simultaneously, the lock lever 212 is pushed by the first cutout gear 206, and the force is applied counterclockwise about the support point of the second shaft member 210. The pawl 222 of the lock lever 212 is separated from the ratchet section 14 of the housing 16, and the internal gear 24 is released from the locked state.

In the seventh embodiment, the condition in which the speed reduction ratio transmitted by the output shaft 36 is automatically switched or changed, and the displaceable member of the actuator is displaced at the high torque and the low speed can be kept. This condition is not affected by the number of revolutions of the driving gear 202 which is rotated together with the input shaft 28. Therefore, the seventh embodiment is preferably applicable, for example, to a case in which a soft workpiece such as a sponge is cramped and a case in which a high torque state is required to be continued for a predetermined period of time, for example, when press fitting is performed. Further, the seventh embodiment is advantageous in that the release from the locked state can be instantaneously performed.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An automatic reduction-ratio changing apparatus arranged between a rotary driving source and an actuator, for automatically switching a speed reduction ratio of a displaceable member of said actuator which is displaced reciprocally along an outward route and along a homeward route by a rotary driving force of said rotary driving source, said automatic reduction-ratio changing apparatus comprising:
   a planetary gear mechanism which has an input shaft connected to said rotary driving source and an output shaft connected to said actuator and which includes a sun gear, one or more planet gears, and an internal gear that are meshed with each other;
   a lock mechanism which stops rotation of said internal gear to lock said internal gear by rotating said internal gear having been rotated in the same direction of rotation as that of said sun gear to be rotated in a direction different from that of said sun gear when a load, which exceeds a preset predetermined torque, is applied from said actuator to said internal gear via said output shaft; and
   a lock release mechanism which automatically switches said speed reduction ratio transmitted from said output shaft to said displaceable member of said actuator by releasing said internal gear from a locked state by reversing said sun gear under a driving action of said rotary driving source when said displaceable member of said actuator switches from being displaced along said outward route to being displaced along said homeward route.

2. The automatic reduction-ratio changing apparatus according to claim 1, wherein said lock release mechanism includes a spring member which pulls ends of a pair of lock levers of said lock mechanism in directions to approach one another.

3. The automatic reduction-ratio changing apparatus according to claim 1, wherein said lock release mechanism includes a cam which is rotatable together with said input shaft; and said cam is formed with a guide groove having a V-shaped cross section for guiding a roller provided on a cam-engaging projection of a lock lever of said lock mechanism.

4. The automatic reduction-ratio changing apparatus according to claim 1, wherein said planetary gear mechanism comprises said single sun gear having a small diameter, said plurality of planet gears each having a middle diameter of an identical outer diameter, and said single internal gear having a large diameter, said plurality of planet gears, which are separated from each other by predetermined angles circumferentially, are provided on an outer circumference of said sun gear positioned at a center so that said plurality of planet gears are meshed with said sun gear to revolve therearound and rotate on axes, and said internal gear is provided on an outer circumference of said planet gears.

5. The automatic reduction-ratio changing apparatus according to claim 1, wherein said lock mechanism and said lock release mechanism include a driving gear which has a plurality of teeth formed circumferentially and which is rotatable together with said input shaft, a first cutout gear having a plurality of teeth and a second cutout gear having a single tooth or a plurality of teeth which are axially supported on said internal gear in a superimposed manner by a first shaft member and which are meshed with teeth of said driving gear, a lock lever which is axially supported on said internal gear rotatably by a predetermined angle by a second shaft member, and a torque limiter lever which is axially supported on said internal gear rotatably by a predetermined angle by a third shaft member.

6. The automatic reduction-ratio changing apparatus according to claim 5, wherein said first cutout gear having said plurality of teeth and said second cutout gear having said single tooth or said plurality of teeth are arranged so that said first cutout gear and said second cutout gear are meshed with said teeth of said driving gear while being stacked in a vertical direction, and said teeth of said first and second cutout gears are formed to have substantially identical tooth shapes.

7. The automatic reduction-ratio changing apparatus according to claim 5, wherein an arm, which is engageable with a roller axially attached to said first cutout gear having said plurality of teeth, is provided for said torque limiter lever, and wherein said arm has a first engaging section for retaining said roller at an initial position, and a second engaging section for retaining said roller when said internal gear is in a locked state effected by said lock lever, a triangular projection tab being disposed between said first engaging section and said second engaging section.

8. The automatic reduction-ratio changing apparatus according to claim 1, wherein said lock mechanism and said lock release mechanism include a first gear which is connected to said input shaft and which is rotatable together with said sun gear, a second gear which is meshed with said first gear, a third gear which is meshed with said second gear, and a fixed plate which is fixed to a housing, and wherein a friction member and an engaging member having a pair of substantially U-shaped branched arms are axially supported by a shaft member between said third gear and said fixed plate.

9. The automatic reduction-ratio changing apparatus according to claim 8, wherein a lock member, which surrounds an outer circumferential surface, is installed to said shaft member, and said lock member has a pawl which is axially supported swingably about a support point of said shaft member and a boss section which is connected to said engaging member.

10. The automatic reduction-ratio changing apparatus according to claim 9, wherein said internal gear is locked by engaging said pawl of said lock member with an outer circumferential ratchet section formed on an outer circumferential surface of said internal gear.

11. The automatic reduction-ratio changing apparatus according to claim 1, wherein said lock mechanism and said lock release mechanism include a cam member which is rotatable together with said input shaft, a lock lever which is axially attached to said internal gear by a pin and which is formed with a pawl for engaging with a ratchet section of a housing, a torque limiter lever which is axially attached to said internal gear by a pin at a position symmetrical to said lock lever, and a spring member which is fastened to projections of said lock lever and said torque limiter lever and which pulls, in directions to approach one another, said lock lever and said torque limiter lever which are separated from each other by a predetermined distance.

12. The automatic reduction-ratio changing apparatus according to claim 11, wherein said cam member is formed with a circular arc-shaped section and a single protruding tab.

13. The automatic reduction-ratio changing apparatus according to claim 11, wherein said cam member has a pair of protruding tabs formed coaxially with a central circular arc-shaped section, said central circular arc-shaped section interposed between said protruding tabs, and a cam-engaging mechanism is provided, which is engageable with a end of any one of said protruding tabs when said cam member is rotated.

14. The automatic reduction-ratio changing apparatus according to claim 13, wherein said cam-engaging mechanism includes a pair of engaging members having symmetrical shapes which have columnar engaging sections for contacting said ends of said protruding tabs of said cam member and which are provided rotatably by predetermined angles about support points of pins, a spring member which is fastened to projections of said pair of engaging members and which pulls said pair of engaging members in directions to approach one another, and a pair of stopper pins which limit ranges of rotation of said pair of engaging members and which limit a distance between said pair of engaging members pulled by said spring member.

15. The automatic reduction-ratio changing apparatus according to claim 1, wherein said lock mechanism includes a lock lever which is provided on a wall section of said internal gear, and said internal gear is locked when said lock lever is engaged with a ratchet section formed on an inner circumferential surface of a housing.

16. The automatic reduction-ratio changing apparatus according to claim 15, wherein said lock mechanism includes a cam which is rotatable together with said input shaft, and said lock lever has a cam-engaging projection which is engageable with a V-groove formed on said cam, and a pawl which is engageable with said ratchet section.

17. The automatic reduction-ratio changing apparatus according to claim 15, wherein said lock lever comprises a pair of lock levers which have substantially L-shaped cross sections, and ends of said pair of lock levers are pulled by a spring member in directions to approach one another.

18. The automatic reduction-ratio changing apparatus according to claim 17, wherein said pair of lock levers are provided with long holes which allow said pair of lock levers to swing by predetermined angles about support points of pins.

19. The automatic reduction-ratio changing apparatus according to claim 1, further comprising a connecting element for integrally connecting said rotary driving source and said actuator.

20. The automatic reduction-ratio changing apparatus according to claim 19, wherein said connecting element includes bolts which are inserted into attachment holes formed at four corners of a housing.

* * * * *